United States Patent [19]
Yamamoto et al.

[11] Patent Number: 5,303,247
[45] Date of Patent: Apr. 12, 1994

[54] OPTICAL HARMONIC GENERATING DEVICE FOR GENERATING HARMONIC WAVE FROM FUNDAMENTAL WAVE AND SHORTER WAVELENGTH LASER GENERATING APPARATUS IN WHICH FUNDAMENTAL WAVE OF LASER IS CONVERTED TO HARMONIC WAVE WITH THE DEVICE

[75] Inventors: Kazuhisa Yamamoto; Kiminori Mizuuchi, both of Osaka, Japan

[73] Assignee: Matsushita Electric Industrial Co., Ltd., Osaka, Japan

[21] Appl. No.: 28,864

[22] Filed: Mar. 10, 1993

[30] Foreign Application Priority Data

Mar. 11, 1992 [JP] Japan .................................. 4-052548
Jan. 20, 1993 [JP] Japan .................................. 5-007253

[51] Int. Cl.⁵ .............................................. H01S 3/10
[52] U.S. Cl. .................................. 372/22; 372/21; 372/7; 372/106; 359/328; 385/122
[58] Field of Search ...................... 372/21, 22, 96, 102, 372/106, 7; 359/328; 385/122

[56] References Cited

U.S. PATENT DOCUMENTS

| | | | |
|---|---|---|---|
| 5,036,220 | 7/1991 | Byer et al. | 359/328 |
| 5,052,770 | 10/1991 | Papuchon | 359/328 |
| 5,121,250 | 6/1992 | Shinozaki et al. | 372/22 |
| 5,185,752 | 2/1993 | Welch et al. | 372/22 |

FOREIGN PATENT DOCUMENTS

| | | | |
|---|---|---|---|
| 4003128 | 1/1992 | Japan | 359/328 |
| 4254835 | 9/1992 | Japan | 359/328 |
| 4340525 | 11/1992 | Japan | 359/328 |

OTHER PUBLICATIONS

"Blue light generation by frequency doubling in periodically poled lithium niobate channel waveguide" by E. J. Lim et al; Electronics Letters, vol. 25, No. 11; May 25, 1989; pp. 731-732.

"Milliwatt-order blue-light generation in a periodically domain-inverted $LiTaO_3$ waveguide" by K. Yamamoto et al; Optics Letters, vol. 16, No. 15; Aug. 1, 1991; pp. 1156-1158.

Primary Examiner—Leon Scott, Jr.
Attorney, Agent, or Firm—Lowe, Price, LeBlanc & Becker

[57] ABSTRACT

An optical harmonic generating device is provided with reverse polarization layers which are made of non-linear optical crystal polarized in a lower direction and are periodically arranged at regular intervals, a non-reverse polarization layer which is made of the non-linear optical crystal polarized in the upper direction and is arrange to surround the reverse polarization layers, a wave guide penetrating through alternate rows of the reverse and non-reverse polarization layers, a first electrode arranged on the wave guide, and second electrodes arranged on both ends of the alternate rows. Electric field is induced between the first and second electrodes through the wave guide to change a refractive index of the reverse and non-reverse polarization layers. A part of the fundamental wave passes through the alternate rows to be converted to the harmonic wave, and another part of the fundamental wave passes through the non-reverse polarization layer positioned under the reverse polarization layers to change the refractive index for the fundamental wave.

25 Claims, 12 Drawing Sheets

| AMBIENT TEMPERATURE (°C) | INTENSITY OF HARMONIC WAVE (mW) | |
|---|---|---|
| | CONVENTIONAL APPARATUS | APPARATUS 51 |
| 25°C | 3mW | 3mW |
| 35°C | 0mW | 2.9mW |

OPTICAL HARMONIC GENERATING DEVICE FOR GENERATING HARMONIC WAVE FROM FUNDAMENTAL WAVE AND SHORTER WAVELENGTH LASER GENERATING APPARATUS IN WHICH FUNDAMENTAL WAVE OF LASER IS CONVERTED TO HARMONIC WAVE WITH THE DEVICE

BACKGROUND OF THE INVENTION

1. Field of the Invention:

The present invention relates to an optical harmonic generating device in which a harmonic wave of laser is generated from a fundamental wave of the laser and a shorter wavelength generating apparatus in which laser generated in a laser source is converted to a harmonic wave thereof by utilizing the optical harmonic generating device to produce coherent light utilized in a photo information processing field and a photo applied measuring control field.

2. Description of the Related Art:

An optical harmonic generating device has been conventionally developed to convert a fundamental wave of laser to a harmonic wave. The laser such as semiconductor laser is generally composed of the fundamental wave and a plurality of harmonic waves such as a second harmonic wave. The intensity of the laser is almost occupied by the fundamental wave. A wavelength $\lambda_f$ of the fundamental wave is longer than those of the harmonic waves, and each of wavelengths $\lambda_h$ of harmonic waves is defined as a multiple of the wavelength $\lambda_f$. For example, the wavelength $\lambda_h$ of the second harmonic wave is half of the wavelength $\lambda_f$. Therefore, the conversion of the fundamental wave to the harmonic wave means that the wavelength of the fundamental wave is shortened.

The harmonic wave is generally produced in a shorter wavelength generating apparatus. That is, a fundamental wave of laser generated in a laser source is converted to a harmonic wave in the shorter wavelength generating apparatus. Because the harmonic wave has a shortened wavelength, the harmonic wave is useful in a photo information processing field. That is, the harmonic wave is utilized as a data signal, and information consisting of a large number of data signals is processed in the field. Also, the harmonic wave is useful in a photo applied measuring control field. That is, a length of a subject is measured by utilizing the harmonic wave.

2.1. Previously Proposed Art:

A conventional optical harmonic generating device is described with reference to drawings. For a detailed description on the conventional optical harmonic generating device, see E. J. Lim, M. M. Fejer, R. L. Byer and W. J. KoZlovsky, "Blue Light Generation by Frequency Doubling in Periodically-Poled Lithium Niobate Channel Waveguide", Electronics Letter, Vol. 27, P731-732, 1989.

FIG. 1 is a diagonal view of a conventional optical harmonic generating device.

As shown in FIG. 1, a conventional optical harmonic generating device 11 is provided with a substrate 12 made of non-linear optical crystal LiNbO$_3$ which is dielectrically polarized in an upper direction, a plurality of reverse polarization layers 13 which are periodically arranged in an upper side of the LiNbO$_3$ substrate 12 at regular intervals and are dielectrically polarized in a lower direction, a plurality of non-reverse polarization layers 14 which are periodically formed in the upper side of the LiNbO$_3$ substrate 12 between the reverse polarization layers 13 and are dielectrically polarized in the upper direction, and a wave guide 15 for guiding a fundamental wave P1 of laser from one side of the LiNbO$_3$ substrate 12 to another side through the non-reverse polarization layers 14 and the reverse polarization layers 13.

The reverse and non-reverse polarization layers 13, 14 are also made of the non-linear optical crystal LiNbO$_3$.

The wave guide 15 penetrates alternate rows of the non-reverse and reverse polarization layers 13, 14.

In the above configuration, an operation of the conventional optical harmonic generating device 11 is described.

A beam of laser almost occupied by a fundamental wave P1 of which a wavelength is 820 nm is radiated from a laser source (not shown) to one side of the wave guide 15. The fundamental wave P1 radiated to one side of the wave guide 15 transmits through the waveguide 15. At this time, because the fundamental wave P1 passes through the alternate rows of the reverse and non-reverse polarization layers 13, 14, the fundamental wave P1 is converted to a second harmonic wave P2 of which a wavelength $\lambda_h$ is 410 nm in the reverse polarization layer 13. The phase of the harmonic wave P2 converted is inverted while passing through the reverse polarization layer 13. Thereafter, the harmonic wave P2 of which the phase is inverted passes through the non-reverse polarization layer 14. In this case, because the polarization direction of the non-reverse polarization layer 14 is opposite to the reverse polarization layer 13, the harmonic wave P2 passing through the non-reverse polarization layer 14 is amplified without attenuating. Therefore, the second harmonic wave P2 is radiated from the another side of the wave guide 15 in place of the fundamental wave P1.

Accordingly, mismatching between a propagation constant of the fundamental wave P1 and a propagation constant of the harmonic wave P2 can be compensated by a periodical structure consisting of the alternate rows of the reverse and non-reverse polarization layers 13. As a result, the harmonic wave P2 can be efficiently amplified.

FIG. 2 graphically shows an intensity variation of the second harmonic wave P2 radiated from the another side of the wave guide 15, in comparison with another intensity variation of another harmonic wave P3 radiated from another wave guide 16 in which the reverse polarization layers 13 are replaced with the non-reverse polarization layers 14.

As shown in FIG. 2, in cases where the reverse polarization layers 13 are replaced with the non-reverse polarization layers 14 in another wave guide 16, the intensity of another harmonic wave P3 is periodically increased and decreased at the regular intervals of the non-reverse polarization layers 14 even though a length L of the wave guide 16 is prolonged. Accordingly, the harmonic wave P3 are not amplified.

In contrast, in cases where the alternate rows of the reverse and non-reverse polarization layers 13, 14 are periodically arranged in the wave guide 15 at the regular intervals, the intensity of the harmonic wave P2 is increased in proportion to a squared value L$^2$ of the length L of the wave guide 15.

In this case, a pseudo-phase matching condition is satisfied to amplify the harmonic wave P2. The pseudo-phase matching condition is formulated by an equation.

$$\Lambda 1 = \lambda_f / \{2^*(N2\omega - N\omega)\} \quad (1).$$

Wherein, the symbol Λ1 denotes a pitch between the reverse polarization layers 13, the symbol $\lambda_f$ denotes a wavelength of the fundamental wave P1, the symbol N2ω denotes an effective refractive index of the wave guide 15 for the harmonic wave P2 of the wavelength $\lambda_h = \lambda_f/2$, and the symbol Nω denotes an effective refractive index of the wave guide 15 for the fundamental wave P1 of the wavelength $\lambda_f$. The effective refractive index of the wave guide 15 is defined as an average value of those of the reverse and non-reverse polarization layers 13, 14.

Next, a method for manufacturing the conventional optical harmonic generating device 11 is described with reference to FIGS. 3A to 3C.

FIGS. 3A to 3C are respectively a sectional view of the LiNbO3 substrate, showing processes for manufacturing the conventional optical harmonic generating device 11.

As shown in FIG. 3A, a patterned film 17 made of Ti is deposited on the LiNbO3 substrate 12 according to a lift-off process. In this case, a plurality of rectangular openings 18 surrounded by the Ti film are formed at the pitch Λ1 on the LiNbO3 substrate 12. The pitch Λ1 is several micrometers.

Thereafter, as shown in FIG. 3B, surfaces of the LiNbO3 substrate 12 exposed to the openings 18 are heated at a temperature of almost 1050° C. Therefore, the LiNbO3 substrate 12 exposed to the openings 18 is changed to the reverse polarization layers 13. Thereafter, The Ti film 17 is taken off.

Thereafter, as shown in FIG. 3C, the LiNbO3 substrate 12 with the reverse polarization layers 13 is immersed in a hot benzoic acid and is heated for twenty minutes at a temperature of 200° C. After the LiNbO3 substrate 12 is taken up from the hot benzoic acid, the surface of the LiNbO3 substrate 12 is annealed for three hours at a temperature of 350° C. so that the wave guide 15 is produced in the LiNbO3 substrate 12.

Because the LiNbO3 substrate 12 is immersed in a hot benzoic acid, an electric power of the harmonic wave P2 is 940 nW on condition that the length of the wave guide 15 is 1 mm and an electric power of the functional wave P1 is 14.7 mW.

2.2. Problems to be solved by the Invention:

However, a half band width of the fundamental wave P1 is only 0.1 nm on condition that the length of the wave guide 15 is 5 mm. That is, as shown in FIG. 4, in cases where the wavelength $\lambda_f$ of the fundamental wave P1 varies by 0.05 nm, the electric power of the harmonic wave amplified in the conventional optical harmonic generating device 11 is reduced to half of a maximum value. Therefore, the permissible variation of the wavelength $\lambda_f$ of the fundamental wave P1 is small.

Also, the wavelength of semiconductor laser generated in a semiconductor laser source is easily changed in cases where the temperature of the semiconductor laser source is changed according to environmental conditions such as ambient temperature.

Accordingly, in cases where semiconductor laser generated in the semiconductor laser source is radiated to the conventional optical harmonic generating device 11 in a conventional shorter wavelength generating apparatus, the harmonic wave P2 is not radiated from the device 11, or the electric power of the harmonic wave P2 is considerably reduced because the temperature of the semiconductor laser source is changed.

For example, as shown in FIG. 4, in cases where the wavelength of the semiconductor laser almost occupied by the fundamental wave P1 is 820 nm, the electric power of the harmonic wave P2 is maximized because the pseudo-phase matching condition is completely satisfied. Also, in cases where the temperature of the semiconductor laser source is 20° C., the wavelength of the semiconductor laser is maintained at a value 820 nm. However, in cases where the temperature of the semiconductor laser source is changed from 20° C. to 21° C., the wavelength of the semiconductor laser is changed from 820 nm to 820.2 nm. Therefore, the electric power of the harmonic wave P2 becomes zero.

SUMMARY OF THE INVENTION

A first object of the present invention is to provide, with due consideration to the drawbacks of such a conventional, an optical harmonic generating device in which a harmonic wave of light is stably generated from a fundamental wave of the light at a high electric power without being adversely influenced by environmental conditions such as ambient temperature.

A second object of the present invention is to provide a shorter wavelength generating apparatus in which laser generated in a laser source is stably converted to a harmonic wave thereof by utilizing the optical harmonic generating device.

The first object is achieved by the provision of an optical harmonic generating device for generating a harmonic wave from a fundamental wave, comprising:

fundamental wave converting means for converting the fundamental wave to the harmonic wave in first dielectric polarization layers of which a dielectric polarization is directed in a first direction, the first dielectric polarization layers being periodically arranged at regular intervals;

harmonic wave amplifying means for amplifying the harmonic wave converted in the fundamental wave converting means in second dielectric polarization layers of which a dielectric polarization is directed in a second direction opposite to the first direction, each of the second dielectric polarization layers being arranged between the first dielectric polarization layers; and electric field inducing means for inducing electric field in the first dielectric polarization layers of the fundamental wave converting means and the second dielectric polarization layers of the harmonic wave amplifying means to change refractive indices of the first and second dielectric polarization layers.

In the above configuration, in cases where a fundamental wave has a standard wavelength, a pseudo-phase matching condition is satisfied. The pseudo-phase matching condition is formulated by an equation $\Lambda 1 = \lambda_f/\{2^* (N2\omega - N\omega)\}$. Wherein, the symbol Λ1 denotes a pitch between the first dielectric polarization layers, the symbol $\lambda_f$ denotes a wavelength of the fundamental wave, the symbol N2ω denotes an effective refractive index of the first and second dielectric polarization layers for a harmonic wave of a wavelength $\lambda_h = \frac{1}{2}^*\lambda_f$, and the symbol Nω denotes an effective refractive index of the first and second dielectric polarization layers for the fundamental wave.

In this case, the fundamental wave passes through alternate rows of the first and second dielectric polarization layers of the fundamental wave converting means and the harmonic wave amplifying means. In this case, because the first dielectric polarization layers are periodically arranged at regular intervals, the fundamental wave is converted to the harmonic wave in each of the first dielectric polarization layers. Also, because the second dielectric polarization layers are periodically arranged at the regular intervals, the harmonic wave converted is amplified in each of the second dielectric polarization layers.

In cases where the wavelength of the fundamental wave is changed, the pseudo-phase matching condition is not satisfied. In this case, electric field is induced by the electric inducing means to change refractive indices of the first and second dielectric polarization layers. Therefore, a refractive index term N2ω-Nω of the pseudo-phase matching condition is changed so that the pseudo-phase matching condition is satisfied.

Accordingly, even though the wavelength of the fundamental wave is changed, the harmonic wave can be generated.

Also, the first object is achieved by the provision of an optical harmonic generating device for generating a harmonic wave from a fundamental wave, comprising:

a plurality of reverse polarization layers which are made of non-linear optical crystal and are periodically arranged at regular intervals, the reverse polarization layers being dielectrically polarized in a first direction;

a non-reverse polarization layer which is made of non-linear optical crystal of a first depth S1 and is arranged to surround the reverse polarization layers, the non-reverse polarization layer being dielectrically polarized in a second direction opposite to the first direction, and the first depth S2 being deeper than a second depth S2 of the reverse polarization layers;

a wave guide penetrating through alternate rows of the reverse and non-reverse polarization layers for transmitting the fundamental wave and the harmonic wave, the fundamental wave radiated to one end of the wave guide being converted to the harmonic wave in the reverse polarization layers, and the harmonic wave converted being amplified in the non-reverse polarization layer before the harmonic wave amplified is radiated from another end of the wave guide;

a first electrode arranged on the wave guide; and a second electrode arranged on ends of the alternate rows of the reverse and non-reverse polarization layers, (1) electric field being induced between the first electrode and the second electrode through the wave guide, (2) a part of the electric field passing through the reverse polarization layers in the wave guide from upper sides thereof to lower sides thereof to change a refeactive index of the reverse polarization layers, and (3) another part of the electric field passing through the non-reverse polarization layer in the wave guide from an upper side thereof to a lower side thereof to change a refractive index of the non-reverse polarization layer.

In the above configuration, a fundamental operation is initially described.

In cases where no electric charge is applied to neither the first electrode nor the second electrode, no electric field is induced in the wave guide. In the above condition, a fundamental wave is radiated to one end of the wave guide, and the fundamental wave transmits through the wave guide from one side thereof to another side thereof. Also, in cases where the pseudo-phase matching condition is satisfied, the fundamental wave is converted to a harmonic wave in the reverse polarization layers of the wave guide, and the harmonic wave converted is amplified in the non-reverse polarization layer of the wave guide. The pseudo-phase matching condition $\Lambda 1 = \lambda_f / \{2*(N2\omega - N\omega)\}$ is defined by a pitch $\Lambda 1$ between the reverse polarization layers, a wavelength $\lambda_f$ of the fundamental wave, an effective refractive index $N2\omega$ of the wave guide for the harmonic wave of the wavelength $\lambda_f/2$, and an effective refractive index $N\omega$ of the wave guide for the fundamental wave of the wavelength $\lambda_f$.

Therefore, in cases where the pseudo-phase matching condition is satisfied, the harmonic wave amplified is radiated from the optical harmonic generating device.

Next, a controlled operation is described.

In cases where the wavelength $\lambda_f$ of the fundamental wave is changed because an ambient temperature is, for example, changed, the pseudo-phase matching condition is not satisfied. Therefore, no harmonic wave is radiated from the optical harmonic generating device unless a refractive index term $(N2\omega - N\omega)$ of the pseudo-phase matching condition is changed.

In the present invention, the refractive index term $(N2\omega - N\omega)$ is changed by inducing electric field in the wave guide.

In detail, because the reverse polarization layers are made of the non-linear optical crystal, a refractive index of the reverse polarization layers is changed. Also, because the non-reverse polarization layer is made of the non-linear optical crystal, a refractive index of the non-reverse polarization layer is also changed.

In this case, because a polarization direction of the reverse polarization layers is opposite to that of the non-reverse polarization layer, the refractive index of the reverse polarization layers is reduced (or increased) by a value $\Delta N$. In contrast, the refractive index of the non-reverse polarization layer is increased (or reduced) by the value $\Delta N$.

Therefore, an effective refractive index of alternate rows of the reverse and non-reverse polarization layers is not changed on average because the reduction (or increase) of the refractive index of the reverse polarization layers compensates for the increase (or reduction) of the refractive index of the non-reverse polarization layer. As a result, even though a part of the fundamental wave transmits through the alternate rows of the reverse and non-reverse polarization layers to produce the harmonic wave, the refractive index $N2\omega$ of the wave guide for the harmonic wave is not changed because the harmonic wave only transmits through the alternate rows.

However, a remaining part of the fundamental wave transmits through the non-reverse polarization layer without transmitting through the reverse polarization layers because the second depth S2 of the non-reverse polarization layer is deeper than the first depth S1 of the reverse polarization layers. In this case, because the refractive index of the non-reverse polarization layer is increased (or reduced), the refractive index $N\omega$ of the wave guide for the fundamental wave is increased (or reduced).

Therefore, the refractive index term $(N2\omega - N\omega)$ is changed so that the pseudo-phase matching condition $\Lambda 1 = \lambda_f / \{2*(N2\omega - N\omega)\}$ can be satisfied by inducing the electric field.

Accordingly, the harmonic wave can be produced from the fundamental wave.

Also, in cases where the electric charge applied to one of the first and second electrode is frequently controlled not to satisfy the pseudo-phase matching condition, the harmonic wave can be modulated.

It is preferred that an insulation film be arranged between the wave guide and the first electrode.

In the above configuration, the fundamental and harmonic waves passing trough the wave guide are prevented from being absorbed by the first electrode arranged on the wave guide.

Accordingly, the harmonic wave can be efficiently produced.

Also, the first object is achieved by the provision of an optical harmonic generating device for generating a harmonic wave from a fundamental wave, comprising:

a plurality of reverse polarization layers which are made of non-linear optical crystal and are periodically arranged at regular intervals, the reverse polarization layers being dielectrically polarized in a first direction;

a plurality of non-reverse polarization layers which are made of non-linear optical crystal and are arranged between the reverse polarization layers, the non-reverse polarization layer being dielectrically polarized in a second direction opposite to the first direction;

a wave guide penetrating through alternate rows of the reverse and non-reverse polarization layers for transmitting the fundamental wave and the harmonic wave, the fundamental wave radiated to one end of the wave guide being converted to the harmonic wave in the reverse polarization layers, and the harmonic wave converted being amplified in the non-reverse polarization layer before the harmonic wave amplified is radiated from another end of the wave guide;

a first electrode arranged on the reverse polarization layers; and a second electrode arranged on the non-reverse polarization layers, (1) electric field being induced between the first electrode and the second electrode through the reverse polarization layers and the non-reverse polarization layers, (2) the electric field penetrating through the reverse polarization layers from upper sides thereof to lower sides thereof, and (3) the electric field penetrating through the non-reverse polarization layers from lower sides thereof to upper sides thereof to increase or reduce refractive indices of the reverse and non-reverse polarization layers together.

In the above configuration, a fundamental operation in which no electric field is induced in the wave guide is initially described.

A fundamental wave is radiated to one side of the wave guide, and the fundamental wave transmits through the wave guide from one side thereof to another side thereof. Also, in cases where the pseudo-phase matching condition is satisfied, the fundamental wave is converted to a harmonic wave in the reverse polarization layers, and the harmonic wave converted is amplified in the non-reverse polarization layers.

Therefore, in cases where the pseudo-phase matching condition is satisfied, the harmonic wave amplified is radiated from the optical harmonic generating device.

Next, a controlled operation is described.

In cases where the wavelength $\lambda_f$ of the fundamental wave is changed, the pseudo-phase matching condition is not satisfied. Therefore, no harmonic wave is radiated from the optical harmonic generating device unless a refractive index term $(N2\omega - N\omega)$ of the pseudo-phase matching condition is changed.

In the present invention, the refractive index term $(N2\omega - N\omega)$ is changed by inducing electric field in the wave guide.

In detail, because the electric field penetrates through the reverse polarization layer and the non-reverse polarization layer in series and the polarization direction of the reverse polarization layer is opposite to that of the non-reverse polarization layer, refractive indices of the reverse and non-reverse polarization layers are increased or reduced together.

Therefore, the increase or reduction of the refractive indices of the reverse and non-reverse polarization layers does not compensate for each other. Also, the refractive index $N\omega$ of the wave guide for the fundamental wave is changed by a first value $\Delta N\omega$. Also, the refractive index $N2\omega$ of the wave guide for the harmonic wave is changed by a second value $\Delta N2\omega$.

In addition, variations $\Delta N\omega$, $\Delta N2\omega$ in the refractive indices of the reverse and non-reverse polarization layers are proportional to $N\omega^3 * r(\lambda_f) * E/2$, $N2\omega^3 * r(\lambda_f) * E/2$. Wherein, the symbol $r(\lambda_f)$ denotes an electric-photo constant depending on a wavelength $\lambda_f$ of the fundamental wave, and the symbol E is the intensity of the electric field. The electric-photo constant $r(\lambda)$ is a monotone decreasing function.

Therefore, in cases where the wave guide is set in the electric field, the variation $\Delta N2\omega$ of the refractive index of the wave guide for the harmonic wave are larger than the variations $\Delta N\omega$ of the refractive index of the wave guide for the fundamental wave.

As a result, the refractive index term $(N2\omega - N\omega)$ of the pseudo-phase matching condition is changed so that the pseudo-phase matching condition can be satisfied by inducing the electric field.

Accordingly, the harmonic wave can be produced from the fundamental wave.

Also, in cases where the electric charge applied to one of the first and second electrode is frequently controlled not to satisfy the pseudo-phase matching condition, the harmonic wave can be modulated.

It is preferred that an insulation film be arranged between the wave guide and the first electrode.

In the above configuration, the fundamental and harmonic waves transmitting through the wave guide are prevented from being absorbed by the first electrode arranged on the wave guide.

Accordingly, the harmonic wave can be efficiently produced.

The second object is achieved by the provision of a shorter wavelength generating apparatus, comprising:

laser generating means for generating a beam of laser mainly composed of a fundamental wave;

fundamental wave converting means for converting the fundamental wave generated by the laser generating means to a harmonic wave in first dielectric polarization layers of which a dielectric polarization is directed in a first direction, a wavelength $\lambda_h$ of the harmonic wave being equivalent to a multiple of a wavelength $\lambda_f$ of the fundamental wave, and the first dielectric polarization layers being periodically arranged at regular intervals;

harmonic wave amplifying means for amplifying the harmonic wave converted in the fundamental wave converting means in second dielectric polarization layers of which a dielectric polarization is directed in a second direction opposite to the first direction, each of the second dielectric polarization layers being arranged between the first dielectric polarization layers; and electric field inducing means for inducing electric field in the first dielectric polarization layers of the fundamental wave converting means and the second dielectric polarization layers of the harmonic wave amplifying means to change refractive indices of the first and second dielectric polarization layers.

In the above configuration, even though a wavelength $\lambda_f$ of the fundamental wave of the laser generated by the laser generating means is changed, refractive indices of the first and second dielectric polarization layers are changed by electric field induced by the electric field inducing means. Therefore, the fundamental wave is converted to a harmonic wave of a wavelength $\alpha_b$. In other words, the wavelength of the laser is shortened by the conversion of the fundamental wave to the harmonic wave.

Accordingly, the laser can be stably converted to a harmonic wave to obtain a beam of laser of which a wavelength is shortened, in the shorter wavelength generating apparatus.

BRIEF DESCRIPTION OF THE DRAWINGS

The objects, features and advantages of the present invention will be apparent from the following description taken in conjunction with the accompanying drawings, in which.

DETAIL DESCRIPTION OF THE PREFERRED EMBODIMENTS

Preferred embodiments of an optical harmonic generating device according to the present invention are described with reference to drawings.

1. First Embodiment:

A first embodiment according to the present invention is described with reference to FIGS. 5 to 10.

Figure 1:
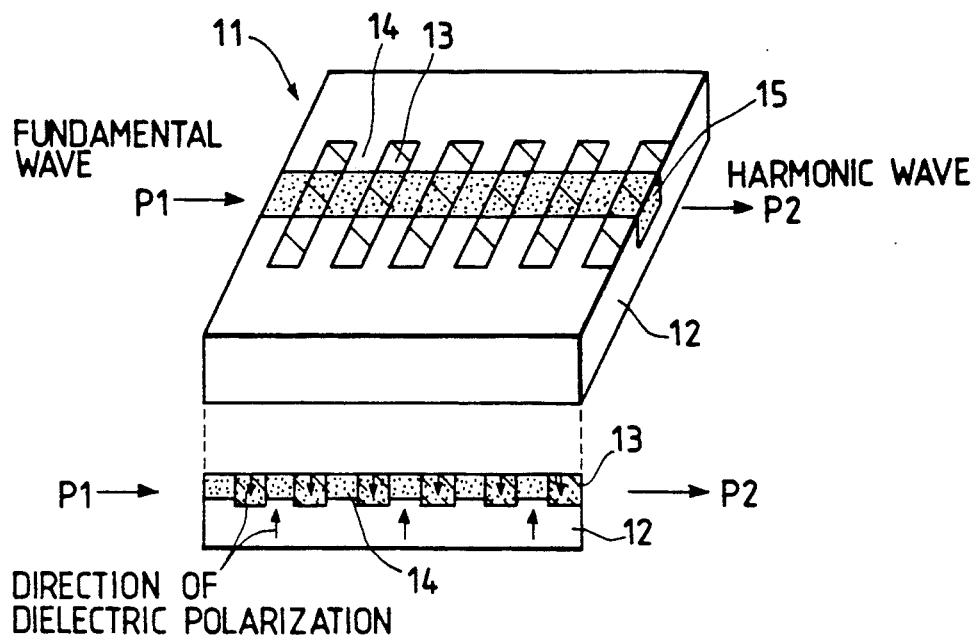
FIG. 1 is a diagonal view of a conventional optical harmonic generating device.
Figure 2:
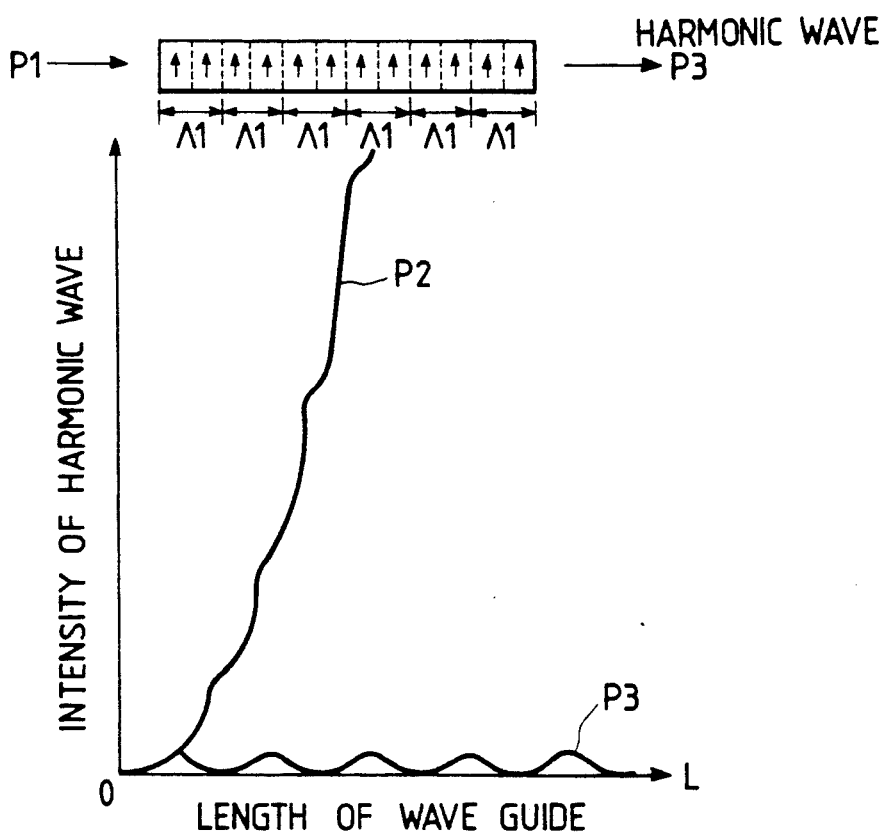
FIG. 2 graphically shows an intensity variation of a second harmonic wave radiated from the another side of a wave guide shown in FIG. 1, in comparison with another intensity variation of another harmonic wave radiated from another wave guide in which reverse polarization layers are replaced with non-reverse polarization layers shown in FIG. 1.
Figure 3A:
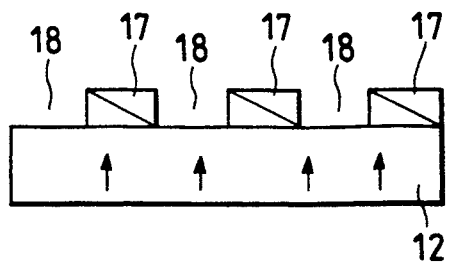
FIGS. 3A to 3C are respectively a sectional view of a $LiNbO_3$ substrate shown in FIG. 1, showing processes for manufacturing the conventional optical harmonic generating device shown in FIG. 1.
Figure 3B:
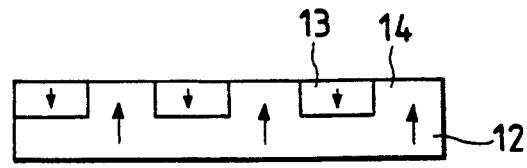
Figure 3C:
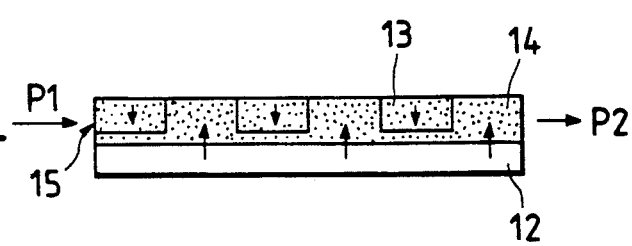
Figure 4:
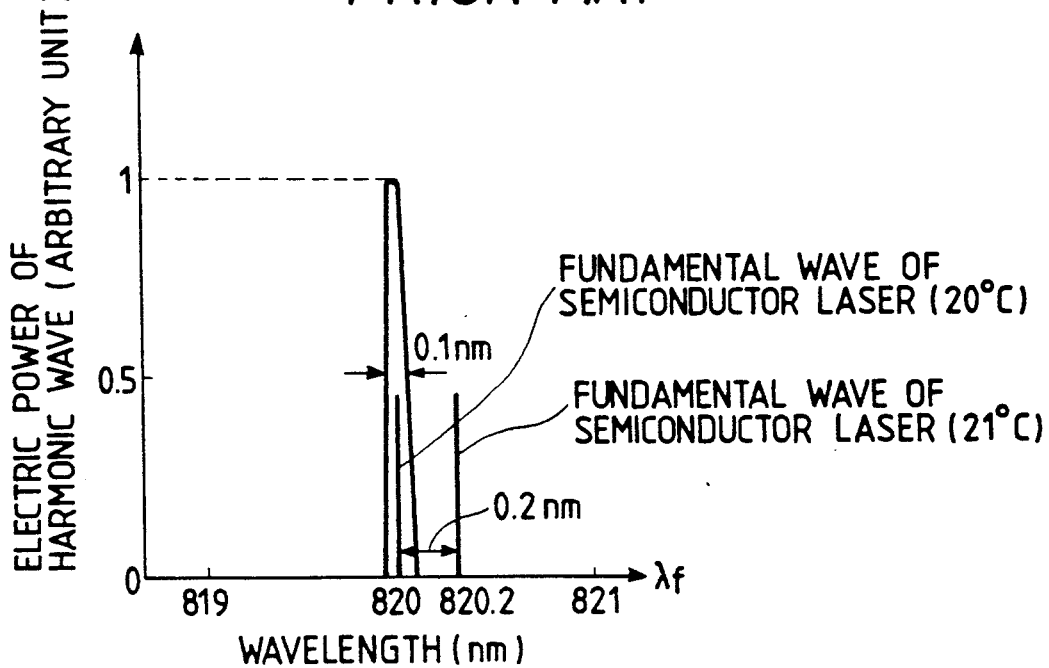
FIG. 4 graphically shows a relationship between an energy power of a harmonic wave amplified in the conventional optical harmonic generating device shown in FIG. 1 and a wavelength of a fundamental wave, the wavelength of the fundamental wave depending on ambient temperature.
Figure 5A:
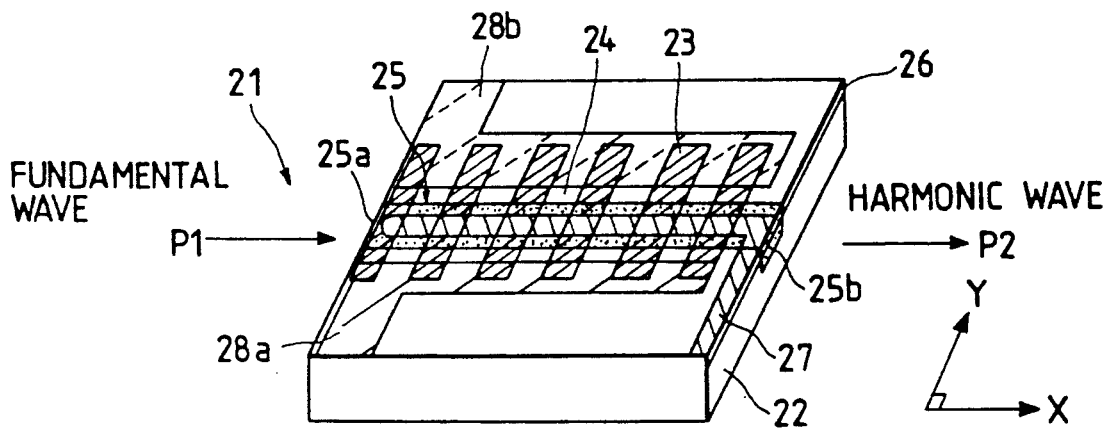
FIG. 5A is a diagonal view of an optical harmonic generating device according to a first embodiment.
Figure 5B:
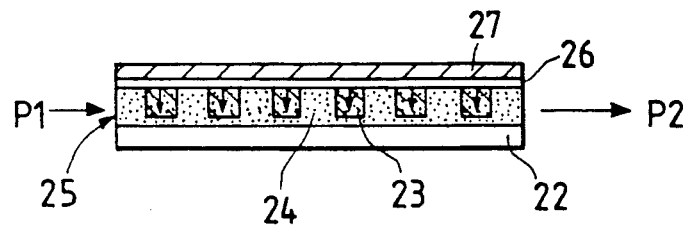
FIG. 5B is a sectional view of the optical harmonic generating device shown in FIG. 5A.
Figure 5C:
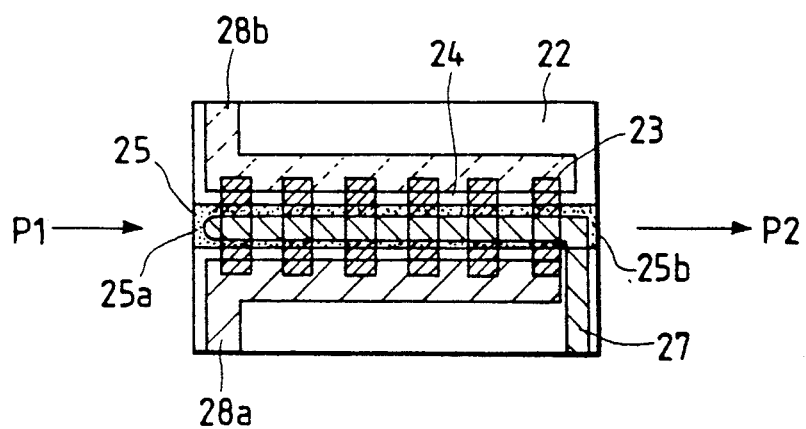
FIG. 5C is a plan view of the optical harmonic generating device shown in FIG. 5A.

FIG. 5A is a diagonal view of an optical harmonic generating device according to the first embodiment. FIG. 5B is a sectional view of the optical harmonic generating device shown in FIG. 5A. FIG. 5C is a plan view of the optical harmonic generating device shown in FIG. 5A.

As shown in FIGS. 5A to 5C, an optical harmonic generating device 21 according to the first embodiment comprises a rectangular solid type of substrate 22 made of non-linear optical crystal LiTaO$_3$ which is dielectrically polarized in an upper direction, a plurality of reverse polarization layers 23 which are periodically arranged in an upper side of the LiTaO$_3$ substrate 22 at regular intervals and are dielectrically polarized in a lower direction, and a non-reverse polarization layer 24 which is arranged in the upper side of the LiTaO$_3$ substrate 22 to surround the reverse polarization layers 23 and is dielectrically polarized in the upper direction.

Also, a wave guide 25 is formed in the middle portions of the reverse polarization layers 23 and the non-reverse polarization layer 24 to guide a fundamental wave P1 of laser from one side of the LiTaO$_3$ substrate 22 to another side through alternate rows of the reverse and non-reverse polarization layers 23, 24.

The LiTaO$_3$ substrate 22 is formed by cutting out LiTaO$_3$ crystal in a perpendicular direction to a Z-axis defined as [001]-direction in the Miller indices. Therefore, the LiTaO$_3$ substrate 22 has an upper surface defined as (001)-plane in the Miller indices.

Also, LiTaO$_3$ material has a strong resistance against a photo-damage. That is, even though the LiTaO$_3$ material is irradiated with a large intensity of light, the refractive index of the LiTaO$_3$ material does not fluctuate.

The reverse and non-reverse polarization layers 23, 24 are respectively made of the non-linear optical crystal LiTaO$_3$.

Also, the reverse and non-reverse polarization layers 23, 24 respectively have strong electric-photo characteristics. Therefore, the refractive index of the reverse polarization layers 23 for the laser is changed in cases where the reverse polarization layers 23 are set in electric field. Also, the refractive index of the non-reverse polarization layer 24 for the laser is changed in cases where the non-reverse polarization layer 24 is set in the electric field.

That is, in cases where the direction of the electric field is the same as that of the dielectric polarization of the reverse polarization layers 23, the refractive index of the reverse polarization layers 23 is reduced. In contrast, in cases where the direction of the electric field is opposite to that of the dielectric polarization of the reverse polarization layers 23, the refractive index of the reverse polarization layers 23 is increased.

In the same manner, in cases where the direction of the electric field is the same as that of the dielectric polarization of the non-reverse polarization layer 24, the refractive index of the non-reverse polarization layer 24 is reduced. In contrast, in cases where the direction of the electric field is opposite to that of the dielectric polarization of the non-reverse polarization layer 24, the refractive index of the non-reverse polarization layer 24 is increased.

A depth S1 of the non-reverse polarization layer 24 is 2.0 $\mu$m, and a depth S2 of the reverse polarization layers 23 is 1.6 $\mu$m. Also, a depth of the wave guide 25 is 2.0 $\mu$m agreeing with the depth S1 of the non-reverse polarization layer 24. Therefore, the wave guide 25 passes through not only alternate rows of the reverse polarization and non-reverse polarization layers 23, 24 but also the non-reverse polarization layer 24 positioned under the reverse polarization layers 23.

The width of the reverse polarization layers 23 in an X direction is called a phase matching width W, and the phase matching width W is 1.9 $\mu$m. Also, the width of the non-reverse polarization layer 24 in the X direction is 1.9 $\mu$m. Therefore, the reverse polarization layers 23 are periodically arranged at a pitch of 3.8 $\mu$m in the X direction.

The length of the wave guide 25 in the X direction is 1 mm, and the width of the wave guide 25 in a Y direction is 4 $\mu$m.

The optical harmonic generating device 21 further comprises a SiO$_2$ film 26 arranged on the entire upper surface of the LiTaO$_3$ substrate 22, the reverse polarization layers 23 and the non-reverse polarization layer 24, a first electrode 27 arranged above the wave guide 25 through the SiO$_2$ film 26, and a pair of second electrodes 28a, 28b arranged above end portions of reverse and non-reverse polarization layers 23, 24 through the SiO$_2$ film 26.

The first and second electrodes 27, 28a, 28b are made of a Ti film of which the thickness is 200 nm.

Figure 6A:
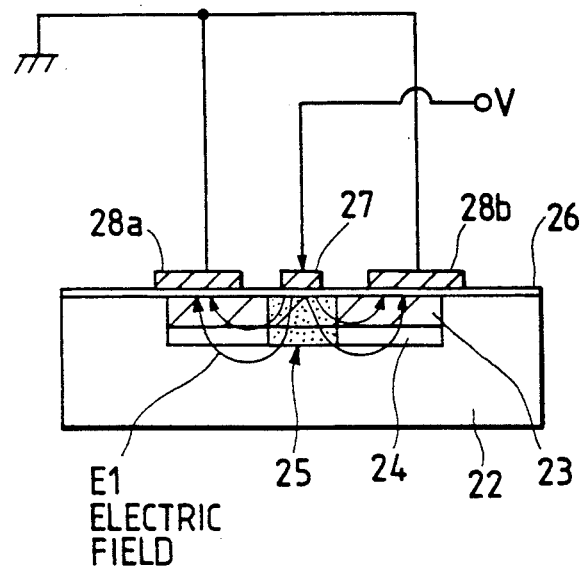
FIG. 6A is a sectional view of the optical harmonic generating device shown in FIG. 5A, showing electric field induced between a first electrode and second electrodes while crossing a reverse polarization layer.
Figure 6B:
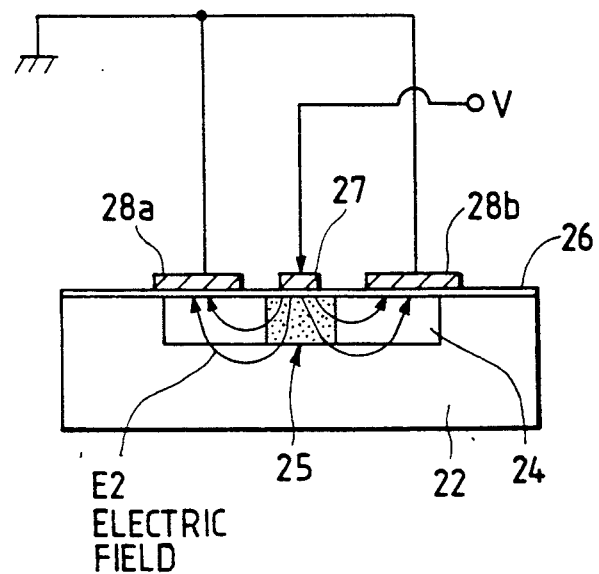
FIG. 6B is a sectional view of the optical harmonic generating device shown in FIG. 5A, showing electric field induced between a first electrode and second electrodes while crossing a non-reverse polarization layer.

FIG. 6A is a sectional view of the optical harmonic generating device 21 shown in FIG. 5A, showing electric field induced between the first electrode 27 and the second electrodes 28a, 28b while crossing the reverse polarization layer 23. FIG. 6B is a sectional view of the optical harmonic generating device 21 shown in FIG. 5A, showing electric field induced between the first electrode 27 and the second electrodes 28a, 28b while crossing the non-reverse polarization layer 24.

As shown in FIGS. 6A, 6B, the first electrode 27 is connected with an external electric source (not shown) to receive positive or negative charges. Therefore, the first electrode 27 is charged to a changeable electric potential. Also, the second electrodes 28a, 28b are grounded.

Therefore, in cases where a changeable positive electric potential V is applied to the first electrode 27, electric field E1 is induced between the first electrode 27 and each of the second electrodes 28a, 28b while crossing each of the reverse polarization layers 23. Also, electric field E2 is induced between the first electrode 27 and each of the second electrodes 28a, 28b while crossing the non-reverse polarization layer 24. The electric field E1 and the electric field E2 are parallel to each other.

In this case, the electric field E1 penetrates the wave guide 25 from an upper side thereof to a lower side thereof. Therefore, the direction of the electric field E1 is the same as that of the dielectric polarization of the reverse polarization layers 23. Also, the direction of the electric field E1 is opposite to that of the dielectric polarization of the non-reverse polarization layer 24 positioned under the reverse polarization layer 23.

As a result, the electric field E1 reduces the refractive index of the reverse polarization layers 23 by a variation $\Delta$N1, and the electric field E1 increases the refractive index of the non-reverse polarization layer 24 under the reverse polarization layers 23 by the variation $\Delta$N1.

Also, the electric field E2 penetrates the wave guide 25 from an upper side thereof to a lower side thereof. Therefore, the direction of the electric field E2 is opposite to that of the dielectric polarization of the non-reverse polarization layer 24 positioned between the reverse polarization layers 23.

As a result, the electric field E2 increases the refractive index of the non-reverse polarization layer 24 positioned between the reverse polarization layers 23 by the variation $\Delta$N1.

In the above configuration, a fundamental operation in which a semiconductor laser source (not shown) is maintained at a standard temperature is initially described.

In cases where the semiconductor laser source is maintained at the standard temperature, a fundamental wave P1 of which a wavelength $\lambda_f$ is 860 nm is generated in the semiconductor laser source. Also, in cases where the fundamental wave P1 having the wavelength $\lambda_f$ of 860 nm is radiated to an inlet portion 25a of the wave guide 25, the pseudo-phase matching condition $\Lambda 1 = \lambda_f/\{2*(N2\omega - N\omega)\}$ is satisfied in the optical harmonic generating device 21 on condition that no electric field is induced in the optical harmonic generating device 21.

Therefore, when the fundamental wave P1 having the wavelength $\lambda_f$ of 860 nm is radiated to the inlet portion 25a of the wave guide 25, the fundamental wave P1 radiated is converted to a harmonic wave P2 in the reverse polarization layers 23 having the phase matching width W. A wavelength 80 $_h$ of the harmonic wave P2 is 430 nm.

Thereafter, the harmonic wave P2 converted is amplified in the non-reverse polarization layer 24. That is, the conversion of the fundamental wave P1 to the harmonic wave P2 and the amplification of the harmonic wave P2 converted are repeated in the wave guide 25. Finally, the harmonic wave P2 converted and amplified is radiated from an output portion 25b of the wave guide 25.

In this case, the fundamental wave P1 radiated to the inlet portion 25a of the wave guide 25 is distributed in a peculiar shape.

Figure 7A:
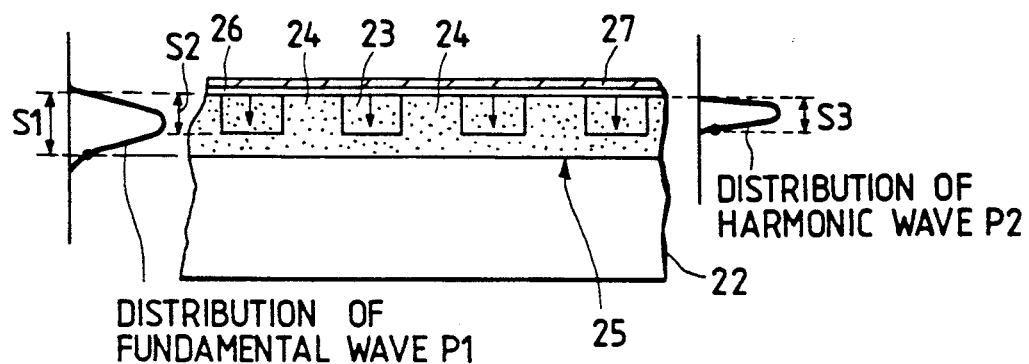
FIG. 7A is a sectional view of both a fundamental wave P1 radiated to an input portion of a wave guide and a harmonic wave P2 radiated from an output portion of the wave guide shown in FIG. 5A, showing distributions of both the fundamental wave P1 and the harmonic wave P2.
Figure 7B:
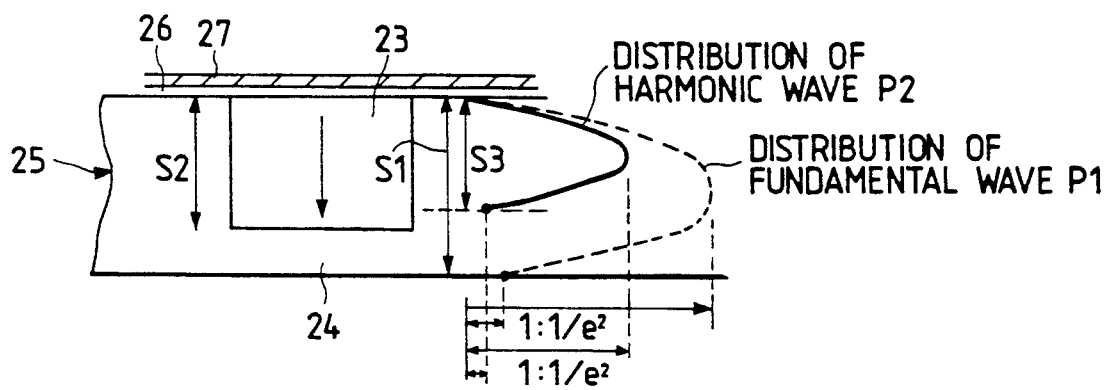
FIG. 7B is an enlarged sectional view of both the fundamental wave P1 and the harmonic wave P2 shown in FIG. 7A.

FIG. 7A is a sectional view of both the fundamental wave P1 radiated to the input portion 25a of the wave guide 25 and the harmonic wave P2 radiated from the output portion 25b of the wave guide 25, showing distributions of both the fundamental wave P1 and the harmonic wave P2. FIG. 7B is an enlarged sectional view of both the fundamental wave P1 and the harmonic wave P2 shown in FIG. 7A.

As shown in FIGS. 7A, 7B, the fundamental wave P1 spreads over the entire inlet portion 25a of the wave guide 25, and the intensity of the fundamental wave P1 is maximized at the center of the inlet portion 25a of the wave guide 25. Also, the intensity of the fundamental wave P1 is rapidly decreased at peripheries of the inlet portion 25a of the wave guide 25. Specifically, the intensity of the fundamental wave P1 is reduced to $1/e^2$ of a maximum intensity thereof at the depth S1 of 2 $\mu$m in the wave guide 25.

Therefore, all of the fundamental wave P1 is substantially and statistically radiated to the wave guide 25.

In contrast, because a part of the fundamental wave P1 passing through the non-reverse polarization layer 24 under the reverse polarization layers 23 does not pass through the reverse polarization layers 23, the part of the fundamental wave P1 is not converted to the harmonic wave P2. Therefore, the intensity of the harmonic wave P2 radiated from the outlet 25b of the wave guide 25 is reduced to $1/e^2$ of a maximum intensity thereof at a depth S3 of the wave guide 25. The depth S3 is smaller than the depth $S2 = 1.6$ $\mu$m of the reverse polarization layer 23.

In short, the depth S1 of the wave guide 25 at which the intensity of the fundamental wave P1 is reduced to $1/e^2$ of the maximum intensity thereof is larger than the depth S2 ($S2 = 1.6$ $\mu$m) of the reverse polarization layer 23. In contrast, the depth S3 of the wave guide 25 at which the intensity of the harmonic wave P2 is reduced to $1/e^2$ of the maximum intensity thereof is smaller than the depth S2 ($S2 = 1.6$ $\mu$m) of the reverse polarization layer 23.

Next, a controlled operation in which the wavelength $\lambda_f$ of the fundamental wave P1 is smaller than 860 nm is described in detail.

In cases where the wavelength $\lambda_f$ of the fundamental wave P1 is shortened from a standard wavelength 860 nm to a shortened wavelength, the intensity of the harmonic wave P2 radiated from the outlet 25b of the wave guide 25 is reduced because the pseudo-phase matching condition is not satisfied. In this case, the intensity of the harmonic wave P2 is always monitored by a monitor section (not shown) so that a control section (not shown) is informed of the reduction of the intensity of the harmonic wave P2. Thereafter, a changeable positive electric potential is applied to the first electrode 27 under control of the control section so that the electric fields E1, E2 are induced in the optical harmonic generating device 21.

Therefore, the fundamental wave P1 radiated to the input portion 25a of the wave guide 25 passes through the wave guide 25 while crossing the electric fields E1, E2. In this case, when a part of the fundamental wave P1 passes through alternate rows of the reverse and non-reverse polarization layers 23, 24, the pseudo-phase matching condition is not satisfied. The reason is as follows. The increase of the refractive index of the reverse polarization layers 23 compensates for the reduction of the refractive index of the non-reverse polarization layer 24. Therefore, even though the electric fields E1, E2 are induced, the refractive index of the alternate rows of the reverse and non-reverse polarization layers 23, 24 is not changed on average. Therefore, a refractive index term $N2\omega - N\omega$ of the pseudo-phase matching condition is not changed.

In contrast, a remaining part of the fundamental wave P1 only passes through the non-reverse polarization layer 24 because the remaining part of the fundamental wave P1 passes through the non-reverse polarization layer 24 positioned under the reverse polarization layer 23. In this case, the refractive index of the non-reverse polarization layer 24 is increased.

Therefore, the refractive index $N\omega$ of the wave guide 25 for the fundamental wave P1 is increased to an increased refractive index $N\omega + \Delta N\omega$ on average in the optical harmonic generating device 21. In contrast, because the harmonic wave P2 only passes through the alternate rows of the reverse and non-reverse polarization layers 23, 24, the refractive index $N2\omega$ of the wave guide 25 for the harmonic wave P2 is not changed on average in the optical harmonic generating device 21.

Figure 7C:
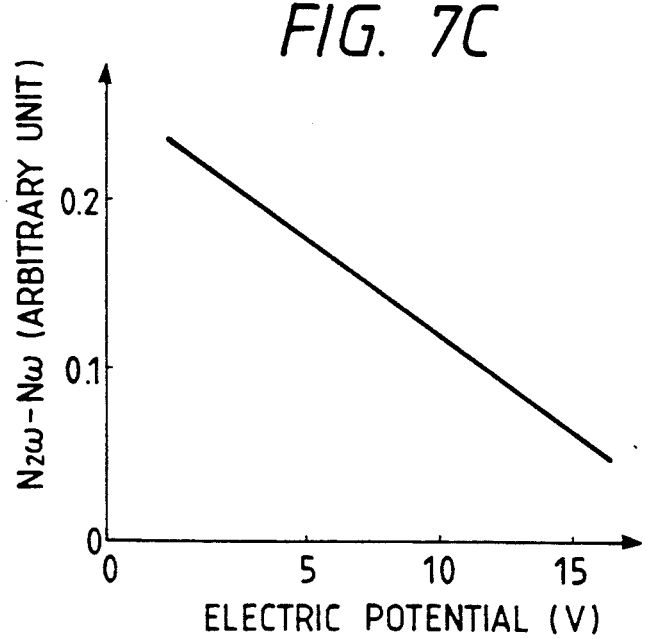
FIG. 7C graphically shows a variation of a refractive index term $N2\omega - N\omega$ of the pseudo-phase matching condition.

Therefore, as shown in FIG. 7C, the refractive index term ($N2\omega - N\omega$) of the pseudo-phase matching condition is reduced to a controlled value ($N2\omega - N\omega - \Delta N\omega$). As a result, even the wavelength $\lambda_f$ of the fundamental wave P1 is shortened to the shortened wavelength $\lambda_f - \Delta \lambda_f$ shorter than 860 nm because the semiconductor laser source is, for example, cooled, the pseudo-phase matching condition $\Lambda 1 = (\lambda_f - \Delta \lambda_f)/\{2*(N2\omega - N\omega)\}$ not satisfied is changed to a controlled pseudo-phase matching condition $\Lambda 1 = (\lambda_f - \Delta \lambda_f)/\{2*(N2\omega - N\omega - \Delta N\omega)\}$ satisfied. That is, the pseudo-phase matching condition can remain satisfied in the optical harmonic generating device 21 by inducing the electric fields E1, E2 in the optical harmonic generating device 21.

Accordingly, even though the wavelength $\lambda_f$ of the fundamental wave P1 is changed, the harmonic wave P2 can be always radiated from the optical harmonic generating device 21 by inducing the electric fields E1, E2 in the optical harmonic generating device 21.

Also, in cases where the intensities of the electric fields E1, E2 are intentionally changed not to satisfy the pseudo-phase matching condition, the intensity of the harmonic wave P2 is considerably reduced. In other words, the intensity of the harmonic wave P2 can be controlled by changing the intensities of the electric fields E1, E2 under control of the control section.

Accordingly, the harmonic wave P2 can be modulated. Therefore, the harmonic wave P2 modulated in the optical harmonic generating device 21 can be utilized as digital signals for the amplitude modulation, the frequency modulation, and the phase modulation in a digital communication network.

In the first embodiment, the $SiO_2$ film 26 is arranged between the $LiTaO_3$ substrate 22 and the electrodes 27, 28a, 28b to prevent the fundamental and harmonic waves P1, P2 from being absorbed by the electrodes 27, 28a, 28b. Therefore, the harmonic wave P2 can be efficiently produced. However, the $SiO_2$ film 26 is not necessarily required.

Next, a method for manufacturing the optical harmonic generating device 21 with reference to FIGS. 8A to 8E.

FIGS. 8A to 8E are respectively a sectional view of the $LiTaO_3$ substrate 22, showing a method for manufacturing the optical harmonic generating device 21.

Figure 8A:
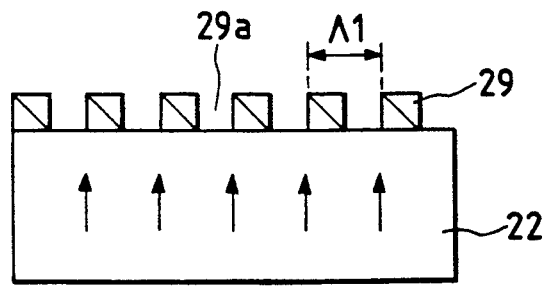
FIGS. 8A to 8E are respectively a sectional view of a $LiTaO_3$ substrate shown in FIG. 5A, showing a method for manufacturing the optical harmonic generating device shown in FIG. 5A.

As shown in FIG. 8A, the $LiTaO_3$ substrate 22 having the upper surface defined as (001)-plane in the Miller indices is prepared. Thereafter, Ta is deposited over the entire $LiTaO_3$ substrate 22 before the Ta deposited is etched according to a photo-lithography process and a dry etching process to form a patterned Ta film 29 on the $LiTaO_3$ substrate 22. In this case, a plurality of rectangular openings 29a surrounded by the Ta film 29 are periodically formed at the pitch $\Lambda 1$ on the $LiTaO_3$ substrate 22. The pitch $\Lambda 1$ is 3.8 $\mu$m.

Figure 8B:
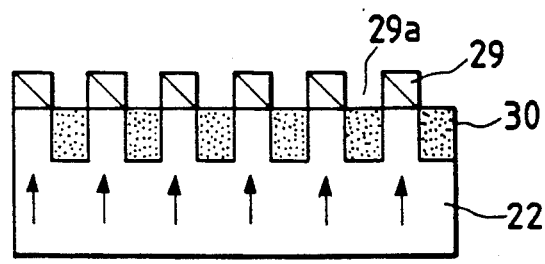

Thereafter, as shown in FIG. 8B, the $LiTaO_3$ substrate 22 is immersed in a pyrophosphoric acid ($H_4P_2O_7$) solution for thirty minutes at a temperature of 260° C. to periodically form a plurality of first proton exchange layers 30 in the $LiTaO_3$ substrate 22 exposed to the openings 29a according to a first proton exchange process. In detail, a part of $Li^+$ ions of the $LiTaO_3$ substrate 22 are exchanged for $H^+$ ions of the pyrophosphoric acid solution according to the first proton exchange process so that the first proton exchange layers 30 made of $LiTaO_3$ and $LiHTaO_3$ are periodically formed. The depth of the first proton exchange layers 30 is 0.8 $\mu$m, the refractive index of the first proton exchange layers 30 is higher than that of the $LiTaO_3$ substrate 22.

Figure 8C:
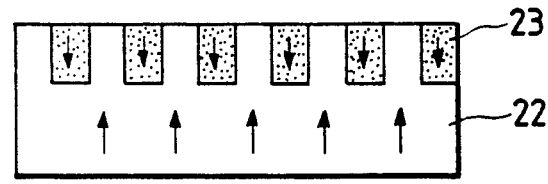

Thereafter, as shown in FIG. 8C, surfaces of the first proton exchange layers 30 in the $LiTaO_3$ substrate 22 are heated for one minute at a temperature of 550° C. Therefore, the dielectric polarization of the first proton exchange layers 30 is reversed from the upper direction to the lower direction while the first proton exchange layers 30 spread into the $LiTaO_3$ substrate 22. The first proton exchange layers 30 of which the dielectric polarization is reversed are called the reverse polarization layers 23, and the depth of the reverse polarization layers 23 is 1.6 $\mu$m. In this case, because the Curie temperature of $LiTaO_3$ is 620° C., the dielectric polarization of the first proton exchange layers 30 is reversed at a low temperature such as 550° C. Thereafter, The Ta film 29 is taken off.

Figure 8D:
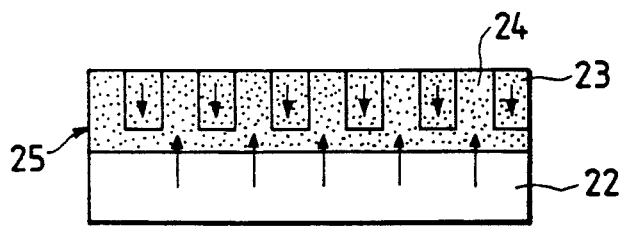

Thereafter, as shown in FIG. 8D, each of the reverse polarization layers 23 is deposited by a Ta film (not shown) to protect $Li^+$ ions of the reverse polarization layers 23 from being exchanged for $H^+$ ions according to a second proton exchange process. The thickness of the Ta films periodically deposited on the reverse polarization layers 23 is 30 nm. Thereafter, the $LiTaO_3$ substrate 22 with the reverse polarization layers 23 on which the Ta films are deposited is immersed in the pyrophosphoric acid solution for sixteen minutes at a temperature of 260° C. according to the second proton exchange process to change the $LiTaO_3$ substrate 22 between the reverse polarization layers 23 to a plurality of second proton exchange layers. Thereafter, the second proton exchange layers are annealed for ten minutes at a temperature of 380° C. while the second proton exchange layers spread into the $LiTaO_3$ substrate 22. As a result, the second proton exchange layers are changed to the non-reverse polarization layer 24.

Figure 8E:
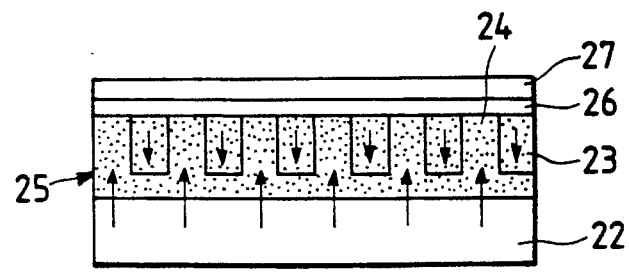

Thereafter, as shown in FIG. 8E, the $SiO_2$ film 26 is deposited over the entire surfaces of the $LiTaO_3$ substrate 22, the reverse polarization layers 23, and the non-reverse polarization layer 24. Thereafter, Ti is deposited on the entire $SiO_2$ film 26 before three patterned Ti films are formed according to a photo-lithography process and a dry etching process. That is, the Ti deposited is etched to form the first electrode 27 above the wave guide 25 through the $SiO_2$ film 26. Also, the Ti deposited is etched to form the second electrodes 28a, 28b above the end portions of the reverse and non-reverse polarization layers 23, 24 through the $SiO_2$ film 26.

Thereafter, both ends of the wave guide 25 are finally polished to form the inlet and outlet portions 25a, 25b of the wave guide 25.

In the above processes, the optical harmonic generating device 21 is manufactured.

Next, a relationship between the wavelength $\lambda_f$ of the fundamental wave P1 and the electric potential V applied to the first electrode 27 in cases where the pseudo-phase matching condition is satisfied is described with reference to FIG. 9.

Figure 9:
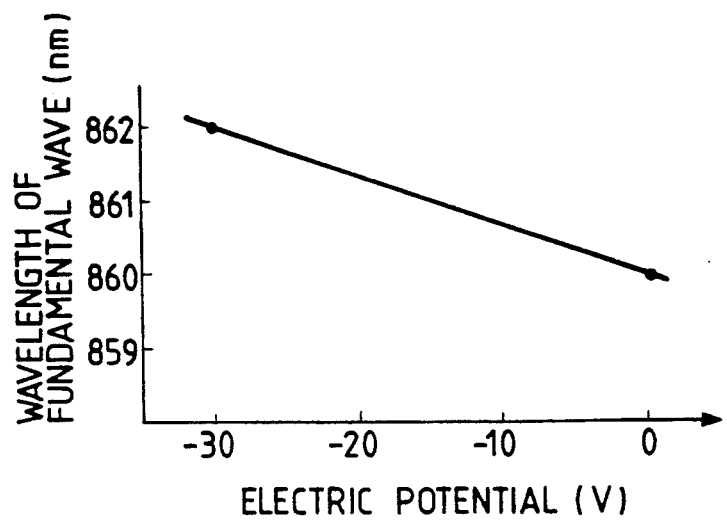
FIG. 9 graphically shows a relationship between a wavelength $\lambda_f$ of a fundamental wave and an electric potential V applied to the first electrode in the optical harmonic generating device shown in FIG. 5A on condition that a pseudophase matching condition is satisfied.

FIG. 9 graphically shows a relationship between the wavelength $\lambda_f$ of the fundamental wave P1 and the electric potential V applied to the first electrode 27 on condition that the pseudo-phase matching condition is satisfied.

As shown in FIG. 9, in cases where no electric potential is applied to the first electrode 27, the fundamental wave P1 of which the wavelength $\lambda_f$ is 860 nm is converted to the harmonic wave P2 of which the wavelength $\lambda_h$ is 430 nm ($\lambda_h = \frac{1}{2} * \lambda_f$), and the harmonic wave P2 converted is amplified in the optical harmonic generating device 21. Also, when the temperature of the semiconductor laser source is increased, the wavelength $\lambda_f$ of the fundamental wave P1 is increased to, for example, 862 nm. In this case, when an electric potential $V = -30$ V is applied to the first electrode 27, the pseudo-phase matching condition is satisfied because the refractive index term is increased.

A conversion efficiency in the electric power from the fundamental wave P1 to the harmonic wave P2 is 2.5% in cases where the electric power of the fundamental wave P1 is 40 mW.

Accordingly, even though the wavelength $\lambda_f$ of the fundamental wave P1 is drastically changed, the pseudo-phase matching condition can be easily satisfied by applying the electric potential to the first electrode 27. Also, the electric potential applied to the first electrode 27 is not large so much.

Also, even though the wave guide 25 is irradiated with the fundamental wave P1, the photo-damage does not occur in the wave guide 25. Accordingly, the harmonic wave P2 can be stably radiated.

Next, the modulation of the harmonic wave P2 is described with reference to FIG. 10.

Figure 10A:
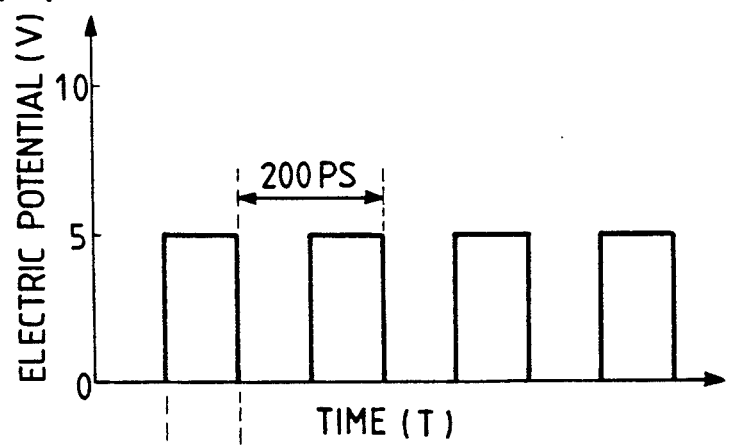
FIGS. 10(a), 10(b) graphically show a relationship between an electric potential applied to a first electrode and the intensity of a harmonic wave in the optical harmonic generating device shown in FIG. 5A.
Figure 10B:
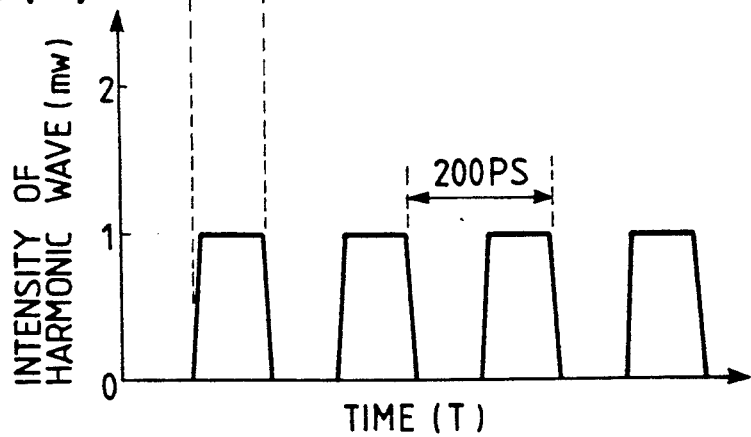

FIGS. 10(a), 10(b) graphically show a relationship between the electric potential applied to the first electrode 27 and the intensity of the harmonic wave P2.

As shown in FIG. 10(a), a series of electric potential pulses is applied to the first electrode 27 on a controlled cycle of 200 ps (or a frequency of 5 GHz). A peak electric potential of the pulses is 5 V. In this case, as shown in FIG. 10(b), a series of harmonic wave pulses P2 is produced on the controlled cycle of 200 ps without being distored.

Accordingly, the harmonic wave P2 can be easily and reliably modulated.

2. Second Embodiment:

Next, a second embodiment according to the present invention is described with reference to FIGS. 11 to 14.

Figure 11A:
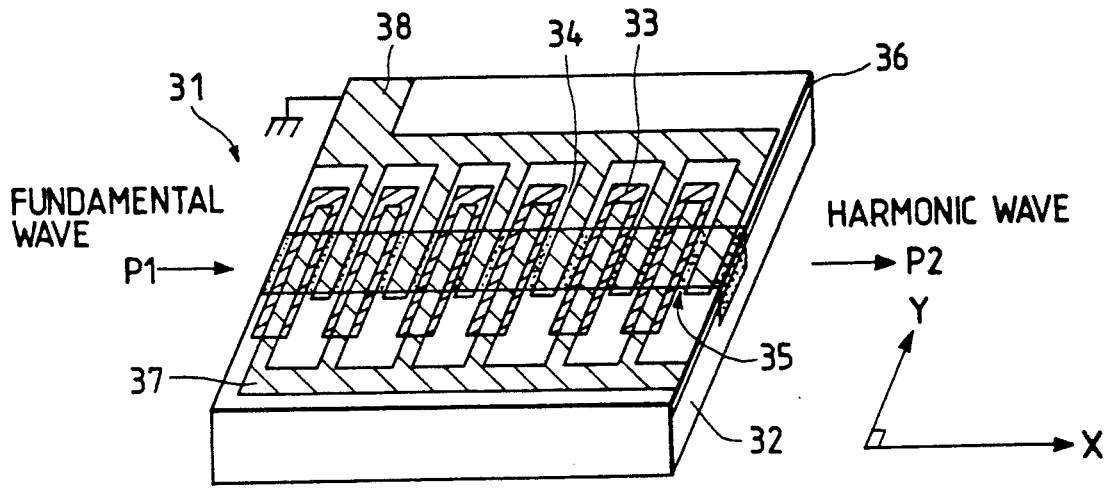
FIG. 11A is a diagonal view of an optical harmonic generating device according to a second embodiment.
Figure 11B:
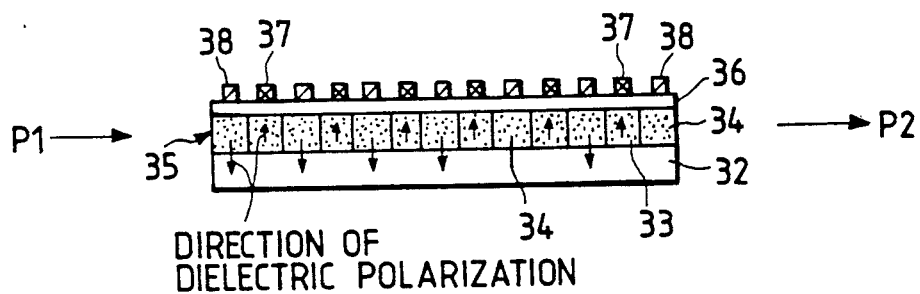
FIG. 11B is a sectional view of the optical harmonic generating device shown in FIG. 11A.
Figure 11C:
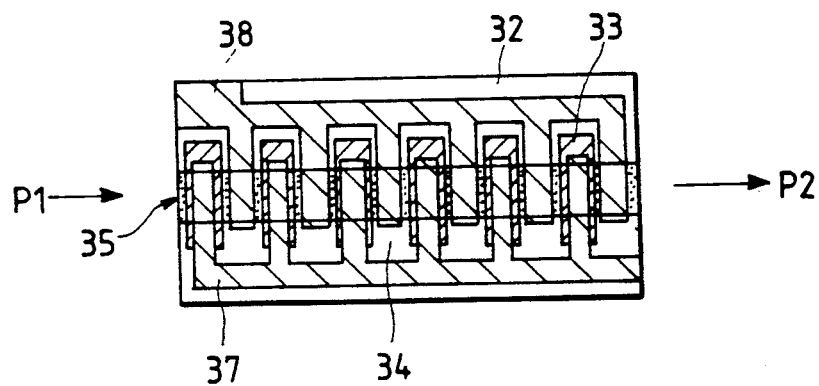
FIG. 11C is a plan view of the optical harmonic generating device shown in FIG. 11A.

FIG. 11A is a diagonal view of an optical harmonic generating device according to the second embodiment. FIG. 11B is a sectional view of the optical harmonic generating device shown in FIG. 11A. FIG. 11C is a plan view of the optical harmonic generating device shown in FIG. 11A.

As shown in FIGS. 11A to 11C, an optical harmonic generating device 31 according to the second embodiment comprises a rectangular solid type of substrate 32 made of non-linear optical crystal LiTaO$_3$ which is dielectrically polarized in a lower direction, a plurality of reverse polarization layers 33 which are periodically arranged in an upper side of the LiTaO$_3$ substrate 32 at regular intervals and are dielectrically polarized in an upper direction, and a plurality of non-reverse polarization layers 34 which is periodically arranged between the reverse polarization layers 33 and is dielectrically polarized in the lower direction.

Also, a wave guide 35 is formed in middle portions of the reverse and non-reverse polarization layers 33, 34 to guide a fundamental wave P1 of laser from one side of the LiTaO$_3$ substrate 32 to another side through alternate rows of the reverse and non-reverse polarization layers 33, 34.

The LiTaO$_3$ substrate 32 has an upper surface defined as (001)-plane in the Miller indices in the same manner as the LiTaO$_3$ substrate 22 of the first embodiment.

The reverse and non-reverse polarization layers 33, 34 are made of the non-linear optical crystal LiTaO$_3$.

Also, the reverse and non-reverse polarization layers 33, 34 respectively have strong electric-photo characteristics. Therefore, the refractive index of the reverse polarization layers 33 for the laser is changed in cases where the reverse polarization layers 33 are set in electric field. Also, the refractive index of the non-reverse polarization layers 34 for the laser is changed in cases where the non-reverse polarization layers 34 are set in the electric field.

That is, in cases where the direction of the electric field is the same as that of the dielectric polarization of the reverse polarization layers 33, the refractive index of the reverse polarization layers 33 is reduced. In contrast, in cases where the direction of the electric field is opposite to that of the dielectric polarization of the reverse polarization layers 33, the refractive index of the reverse polarization layers 33 are increased.

In the same manner, in cases where the direction of the electric field is the same as that of the dielectric polarization of the non-reverse polarization layers 34, the refractive index of the non-reverse polarization layers 34 is reduced. In contrast, in cases where the direction of the electric field is opposite to that of the dielectric polarization of the non-reverse polarization layers 34, the refractive index of the non-reverse polarization layers 34 is increased.

The depth of the non-reverse polarization layers 34 is 1.9 μm, and the depth of the reverse polarization layers 33 is 1.8 μm. Also, the depth of the wave guide 35 is 1.9 μm agreeing with the depth of the non-reverse polarization layers 34. Therefore, the wave guide 35 substantially passes through the alternate rows of the reverse and non-reverse polarization layers 33, 34.

The width of the reverse polarization layers 33 in an X direction is called a phase matching width W, and the phase matching length L is 1.8 μm. Also, the width of the non-reverse polarization layers 34 in the X direction is 1.8 μm. Therefore, the reverse polarization layers 33 are periodically arranged at a pitch of 3.6 μm in the X direction.

The length of the wave guide 35 in the X direction is 1 mm, and the width of the wave guide 35 in a Y direction is 4 μm.

The optical harmonic generating device 31 further comprises a SiO$_2$ film 36 arranged on the entire upper surface of the LiTaO$_3$ substrate 32, the reverse polarization layers 33 and the non-reverse polarization layers 34, a comb-shaped first electrode 37 arranged above the reverse polarization layers 33 through the SiO$_2$ film 36, and a comb-shaped second electrode 38 arranged above the non-reverse polarization layers 34 through the SiO$_2$ film 36.

The first and second electrodes 37, 38 are made of a Ti film of which the thickness is 200 nm. Also, each of tooth portions of comb-shaped first electrode 37 is arranged above one of the reverse polarization layers 33, and each of tooth portions of comb-shaped second electrode 38 is arranged above one of the non-reverse polarization layers 34 between the reverse polarization layers 33.

Figure 12:
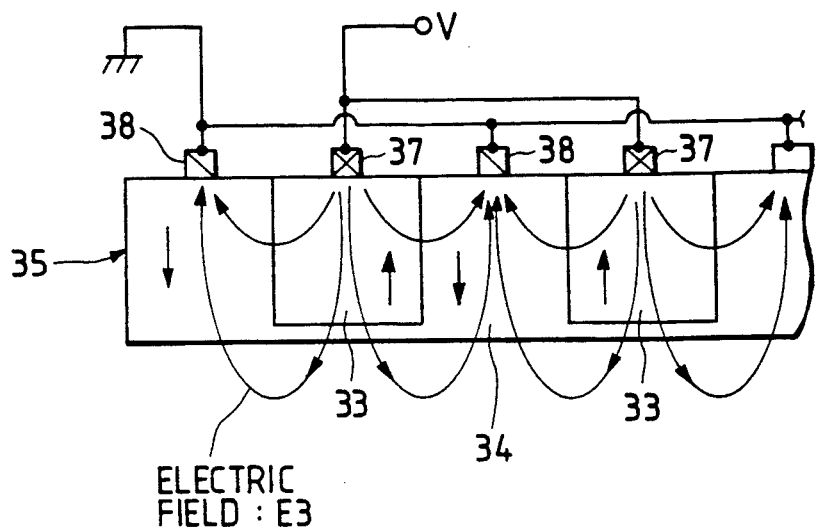
FIG. 12 is a sectional view of the optical harmonic generating device shown in FIG. 11A, showing an electric field induced between first and second electrodes.

FIG. 12 is a sectional view of the optical harmonic generating device 31 shown in FIG. 11A, showing electric field induced between the first and second electrodes 37, 38.

As shown in FIGS. 11A, 11B, the first electrode 37 is connected with an external electric source (not shown) to receive positive or negative charges. Therefore, the first electrode 37 is charged to a changeable electric potential. Also, the second electrode 38 is grounded.

Therefore, in cases where a changeable positive electric potential V is applied to the first electrode 37, electric field E3 is induced between the first and second electrodes 37, 38 while penetrating through the reverse polarization layers 33 and the non-reverse polarization layers 34 in that order. In detail, the electric field E3 is directed in the lower direction when the electric field E3 penetrates through the reverse polarization layers 33. In contrast, the electric field E3 is directed in the upper direction when the electric field E3 penetrates through the non-reverse polarization layers 34. Therefore, the direction of the electric field E3 is opposite to that of the dielectric polarization of the reverse polarization layers 23, and the direction of the electric field E3 is opposite to that of the dielectric polarization of the non-reverse polarization layers 34.

As a result, the electric field E3 increases the refractive index of the reverse polarization layers 33 by a variation $\Delta N$, and the electric field E3 increases the refractive index of the non-reverse polarization layers 34 by the variation $\Delta N$. Therefore, the variation of the refractive index is large on average in the reverse and non-reverse polarization layers 33, 34 as compared with the reverse and non-reverse polarization layers 23, 24 in the first embodiment.

In addition, a refractive index variation $\Delta N\omega$ of the reverse and non-reverse polarization layers 33, 34 for the fundamental wave P1 is proportional to $N\omega^3 * r(\lambda_f) * E/2$, and a refractive index variation $\Delta N2\omega$ of the reverse and non-reverse polarization layers 33, 34 for the harmonic wave P2 is proportional to $N2\omega^3 * r(\lambda_h) * E/2$. Wherein, the symbol $N\omega$ denotes an effective refractive index of the reverse and non-reverse polarization layers 33, 34 for the fundamental wave P1, the symbol $N2\omega$ denotes an effective refractive index of the reverse and non-reverse polarization layers 33, 34 for the harmonic wave P2, the symbol $r(\lambda)$ denotes an electric-photo constant depending on a wavelength $\lambda$ of light, and the symbol E is the intensity of the electric field E3. The electric-photo constant $r(\lambda)$ is a monotone decreasing function so that $r(\lambda_h)$ is larger than $r(\lambda_f)$. Also, the effective refractive indices $N2\omega$, $N\omega$ of the reverse and non-reverse polarization layers 33, 34 are almost the same as each other.

Therefore, in cases where the reverse and non-reverse polarization layers 33, 34 are set in the electric field E3, the refractive index variation $\Delta N2\omega$ of the reverse and non-reverse polarization layers 33, 34 for the harmonic wave P2 is larger than the refractive index variation $\Delta N\omega$ of the reverse and non-reverse polarization layers 33, 34 for the fundamental wave P1.

In the above configuration, a fundamental operation in which a semiconductor laser source (not shown) is maintained at a standard temperature is initially described.

In cases where the semiconductor laser source is maintained at the standard temperature, a fundamental wave P1 of which a wavelength $\lambda_f$ is about 840 nm is generated in the semiconductor laser source. Also, in cases where the fundamental wave P1 having the wavelength $\lambda_f$ of 840 nm is radiated to an inlet portion 35a of the wave guide 35, the pseudo-phase matching condition $\Lambda 1 = \lambda_f / \{2 * (N2\omega - N\omega)\}$ is satisfied in the optical harmonic generating device 31 on condition that no electric field is induced in the optical harmonic generating device 31.

Therefore, when the fundamental wave P1 having the wavelength $\lambda_f$ of 840 nm is radiated to the inlet portion 35a of the wave guide 35, the fundamental wave P1 radiated is converted to a harmonic wave P2 in the reverse polarization layers 33 having the phase matching width W. A wavelength $\lambda_h$ of the harmonic wave P2 is about 420 nm ($\lambda_h = \frac{1}{2} * \lambda_f$).

Thereafter, the harmonic wave P2 converted is amplified in the non-reverse polarization layers 34. That is, the conversion of the fundamental wave P1 to the harmonic wave P2 and the amplification of the harmonic wave P2 converted are repeated in the wave guide 35.

Finally, the harmonic wave P2 converted is radiated from an output portion 35b of the wave guide 35.

Next, a controlled operation in which the wavelength $\lambda_f$ of the fundamental wave P1 is increased from 840 nm to an increased wavelength is described in detail.

In cases where the wavelength $\lambda_f$ of the fundamental wave P1 is changed from 840 nm, the intensity of the harmonic wave P2 radiated from the outlet 35b of the wave guide 35 is reduced. In this case, the intensity of the harmonic wave P2 is always monitored by a monitor section (not shown) so that a control section (not shown) is informed of the reduction of the intensity of the harmonic wave P2. Thereafter, a changeable positive electric potential is applied to the first electrode 37 under control of the control section so that the electric field E3 is induced in the optical harmonic generating device 31.

In cases where the electric field E3 is induced in the optical harmonic generating device 31, the refractive indices of the reverse and non-reverse polarization layers 33, 34 are increased together as described above. In addition, because the electric-photo constant $r(\lambda_h)$ is larger than the electric-photo constant $r(\lambda_f)$, a refractive index variation $\Delta N2\omega$ of the reverse and non-reverse polarization layers 33, 34 for the harmonic wave P2 is larger than a refractive index variation $\Delta N\omega$ of the reverse and non-reverse polarization layers 33, 34 for the fundamental wave P1.

Therefore, a refractive index term $(N2\omega - N\omega)$ of the pseudo-phase matching condition is increased to an increased refractive index term $(N2\omega + \Delta N2\omega - N\omega - \Delta N\omega)$ by inducing the electric field E3 in the optical harmonic generating device 31. As a result, even though the wavelength $\lambda_f$ of the fundamental wave P1 is increased, the electric field E3 can be induced to satisfy the pseudo-phase matching condition.

Accordingly, even though the wavelength $\lambda_f$ of the fundamental wave P1 is changed, the harmonic wave P2 can be always radiated from the optical harmonic generating device 31 by inducing the electric field E3 in the optical harmonic generating device 31.

Also, in cases where the intensity of the electric field E3 is intentionally changed not to satisfy the pseudo-phase matching condition, the intensity of the harmonic wave P2 is considerably reduced. In other words, the intensity of the harmonic wave P2 can be controlled by changing the intensity of the electric field E3 under control of the control section.

Accordingly, the harmonic wave P2 can be modulated. Therefore, the harmonic wave P2 modulated in the optical harmonic generating device 31 can be utilized as digital signals for the amplitude modulation, the frequency modulation, and the phase modulation in a digital communication network.

In the second embodiment, the SiO$_2$ film 36 is arranged between the LiTaO$_3$ substrate 32 and the electrodes 37, 38 to prevent the fundamental and harmonic waves P1, P2 from being absorbed by the electrodes 37, 38. Therefore, the harmonic wave P2 can be efficiently produced. However, the SiO$_2$ film 36 is not necessarily required.

Next, a method for manufacturing the optical harmonic generating device 31 with reference to FIGS. 13A to 13E.

FIGS. 13A to 13E are respectively a sectional view of the LiTaO$_3$ substrate 32, showing a method for manufacturing the optical harmonic generating device 31.

Figure 13A:
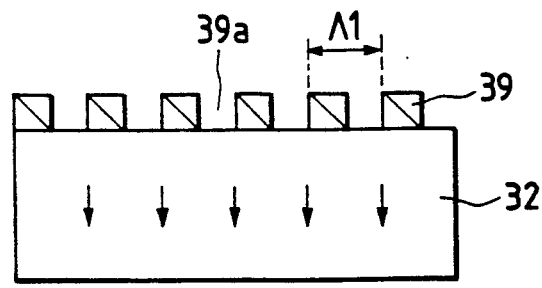
FIGS. 13A to 13E are respectively a sectional view of a $LiTaO_3$ substrate shown in FIG. 11A, showing a method for manufacturing the optical harmonic generating device shown in FIG. 11A.

As shown in FIG. 13A, the LiTaO$_3$ substrate 32 having the upper surface defined as (001)-plane in the Miller indices is prepared. Thereafter, Ta is deposited over the entire LiTaO$_3$ substrate 32 before the Ta deposited is etched according to a photo-lithography process and a dry etching process to form a patterned Ta film 39 on the LiTaO$_3$ substrate 32. In this case, a plurality of rectangular openings 39a surrounded by the Ta film 39 are periodically formed at the pitch Λ1 on the LiTaO$_3$ substrate 32. The pitch Λ1 is 3.6 μm.

Figure 13B:
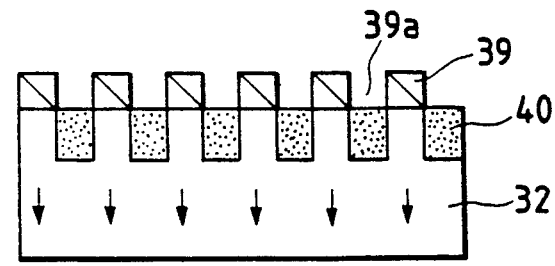

Thereafter, as shown in FIG. 13B, the LiTaO$_3$ substrate 32 is immersed in a pyrophosphoric acid (H$_4$P$_2$O$_7$) solution for thirty minutes at a temperature of 260° C. to periodically form a plurality of first proton exchange layers 40 in the LiTaO$_3$ substrate 32 exposed to the openings of the Ta film 39 according to a first proton exchange process. In detail, a part of Li$^+$ ions of the LiTaO$_3$ substrate 32 are exchanged for H$^+$ ions of the pyrophosphoric acid solution according to the first proton exchange process so that the first proton exchange layers 40 made of LiTaO$_3$ and LiHTaO$_3$ are periodically formed. The depth of the first proton exchange layers 40 is 0.8 μm, and the refractive index of the first proton exchange layers 40 is higher than that of the LiTaO$_3$ substrate 32.

Figure 13C:
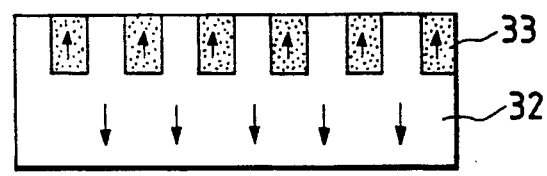
Figure 13D:
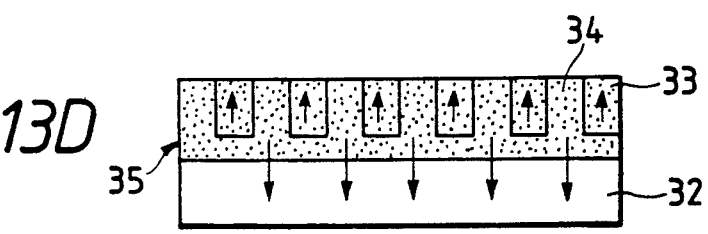
Figure 13E:
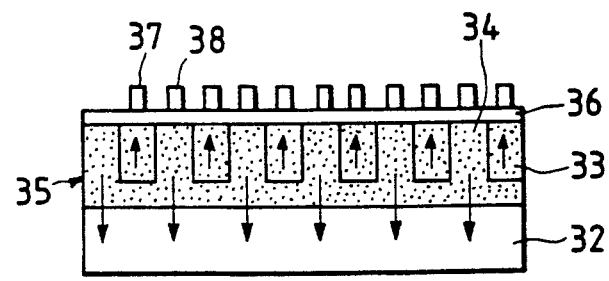

Thereafter, as shown in FIG. 13C, surfaces of the first proton exchange layers 40 in the LiTaO$_3$ substrate 32 are heated for one minute at a temperature of 550° C. Therefore, the dielectric polarization of the first proton exchange layers 40 is reversed from the lower direction to the upper direction while the first proton exchange layers 40 spread into the LiTaO$_3$ substrate 32. The first proton exchange layers 40 of which the dielectric polarization is reversed are called the reverse polarization layers 33, and the depth of the reverse polarization layers 33 is 1.8 μm. In this case, because the Curie temperature of LiTaO$_3$ is 620° C., the dielectric polarization of the first proton exchange layers 40 is reversed at a low temperature such as 550° C. Thereafter, The Ta film 39 is taken off.

Thereafter, as shown in FIG. 8D, each of the reverse polarization layers 33 is deposited by a Ta film (not shown) to protect Li$^+$ ions of the reverse polarization layers 33 from being exchanged for H$^+$ ions according to a second proton exchange process. The thickness of the Ta films periodically deposited on the reverse polarization layers 33 is 30 nm. Thereafter, the LiTaO$_3$ substrate 32 with the reverse polarization layers 33 on which the Ta films are deposited is immersed in the pyrophosphoric acid solution for sixteen minutes at a temperature of 260° C. according to the second proton exchange process to change the LiTaO$_3$ substrate 32 between the reverse polarization layers 33 to a plurality of second proton exchange layers periodically arranged. Thereafter, the second proton exchange layers are annealed for ten minutes at a temperature of 380° C. while the second proton exchange layers spread into the LiTaO$_3$ substrate 32. As a result, the second proton exchange layers are changed to the non-reverse polarization layers 34. The depth of the non-reverse polarization layers 34 is 1.9 μm.

Thereafter, as shown in FIG. 8E, the SiO$_2$ film 36 is deposited over the entire surfaces of the LiTaO$_3$ substrate 32, the reverse polarization layers 33, and the non-reverse polarization layers 34. Thereafter, Ti is deposited on the entire SiO$_2$ film 36 before a pair of patterned Ti films is formed according to a photo-lithography process and a dry etching process. That is, the comb-shaped first electrode 37 of which the tooth portions are arranged above the reverse polarization layers 33 through the SiO$_2$ film 36 is formed of the Ti film. Also, the comb-shaped second electrode 38 of which the tooth portions are arranged above the non-reverse polarization layers 34 between the reverse polarization layers 33 through the SiO$_2$ film 36 is formed of the Ti film.

Thereafter, both ends of the wave guide 35 are finally polished to form the inlet and outlet portions 35a, 35b of the wave guide 35.

In the above processes, the optical harmonic generating device 31 is manufactured.

Next, experimental results obtained by amplifying the harmonic wave P2 in the optical harmonic generating device 31 manufactured according to the above method are described with reference to FIG. 14.

Figure 14:
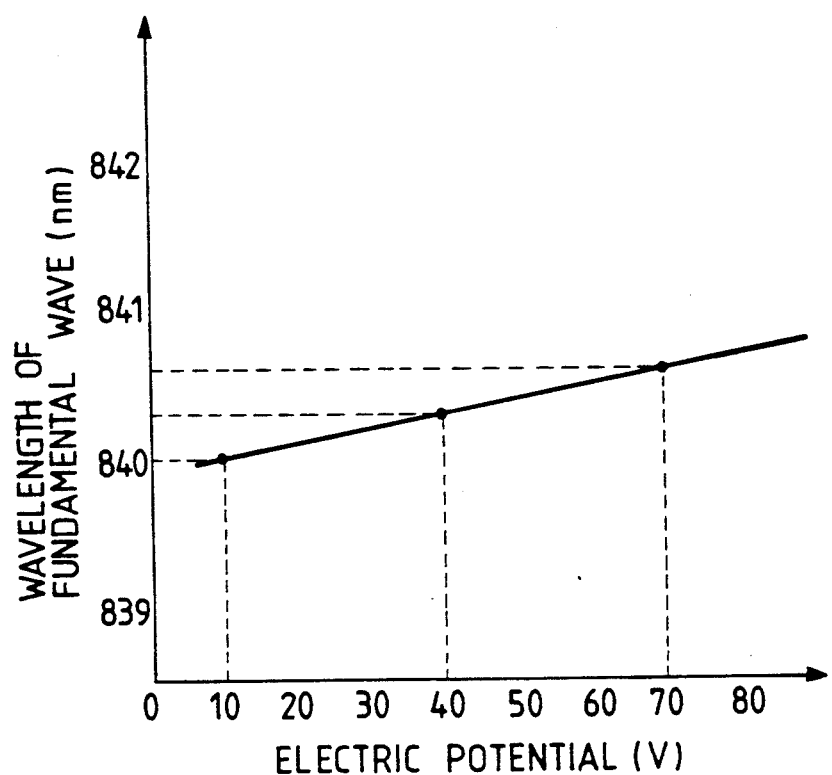
FIG. 14 graphically shows a relationship between a wavelength $\lambda_f$ of a fundamental wave and an electric potential V applied to a first electrode in the optical harmonic generating device shown in FIG. 11A on condition that a pseudo-phase matching condition is satisfied.

FIG. 14 graphically shows a relationship between the wavelength $\lambda_f$ of the fundamental wave P1 and the electric potential V applied to the first electrode 37 on condition that the pseudo-phase matching condition is satisified.

As shown in FIG. 14, in cases where a first electric potential (10 V) is applied to the first electrode 37, the fundamental wave P1 of which the wavelength $\lambda_f$ is 840 nm is converted to the harmonic wave P2 of which the wavelength $\lambda_h$ is 420 nm ($\lambda_h = \frac{1}{2} * \lambda_f$), and the harmonic wave P2 converted is amplified in the optical harmonic generating device 31. In this case, the intensity of the electric field E3 is $2 \times 10^6$ V/m. Also, the electric power of the fundamental wave P1 is 40 mW, and the electric power of the harmonic wave P2 is 1 mW. Therefore, the conversion efficiency in the electric power from the fundamental wave P1 to the harmonic wave P2 is 2.5%. A half band width of the fundamental wave P1 is 0.03 nm. That is, in cases where the wavelength of the fundamental wave P1 varies 0.015 nm, the electric power of the harmonic wave amplified in the optical harmonic generating device 31 is reduced from a maximum value to half of the maximum value.

Also, when the temperature of the semiconductor laser source is increased, the wavelength $\lambda_f$ of the fundamental wave P1 is increased to, for example, 840.3 nm. In this case, when a second electric potential V=40 V is applied to the first electrode 37, the pseudo-phase matching condition is satisfied.

Also, when the temperature of the semiconductor laser source is increased by about 3° C., the wavelength $\lambda_f$ of the fundamental wave P1 is changed from 840 nm to 840.6 nm. In this case, when a third electric potential V=70 V is applied to the first electrode 37, the pseudo-phase matching condition is satisfied.

Accordingly, even though the wavelength $\lambda_f$ of the fundamental wave P1 is changed, the pseudo-phase matching condition can be easily satisfied by applying the electric potential to the first electrode 37. Also, the electric potential applied to the first electrode 37 is not large so much.

Also, even though the wave guide 35 is irradiated with the fundamental wave P1, the photo-damage does not occur in the wave guide 35. Accordingly, the harmonic wave P2 can be stably radiated.

In cases where a series of electric potential pulses is applied to the first electrode 37 on a controlled cycle of 1 ns, a series of harmonic wave pulses P2 is produced on the controlled cycle of 1 ns without being distorted. Therefore, the harmonic wave P2 can be easily and reliably modulated in the same manner as in the first embodiment.

In the first and second embodiments, the fundamental wave P1 is distributed according to a single mode in the Maxwell's electric-magnetic distribution to avoid a mode dispersion.

Also, LiTaO$_3$ is utilized for the substrates 22, 32 and the reverse and non-reverse polarization layers 23, 24, 33, 34 in the first and second embodiments. However, it is preferred that LiNbO$_3$, KTiOPO$_4$, or 2-Methyl-4-Nitroaniline be utilized for material of the substrates 22, 32 and the reverse and non-reverse polarization layers 23, 24, 33, 34 in place of LiTaO$_3$. For example, LiNbO$_3$ has a large non-linear constant in the electric-photo characteristics. Therefore, the refractive index of LiNbO$_3$ is considerably changed by the electric field. Moreover, in cases where MgO is doped in LiNbO$_3$, the substrate made of LiNbO$_3$ in which MgO is doped has a strong resistance against the photo damage.

Also, it is preferred that LiNb$_x$Ta$_{1-x}$O$_3$ ($0 \leq X \leq 1$) be utilized for material of the substrates 22, 32 and the reverse and non-reverse polarization layers 23, 24, 33, 34 in place of LiTaO$_3$. In this case, LiNb$_x$Ta$_{1-x}$O$_3$ has a large non-linear constant and a great resistance against the photo-damage.

3. Third Embodiment

A third embodiment according to the present invention is described with reference to FIGS. 15 to 18.

Figure 15:
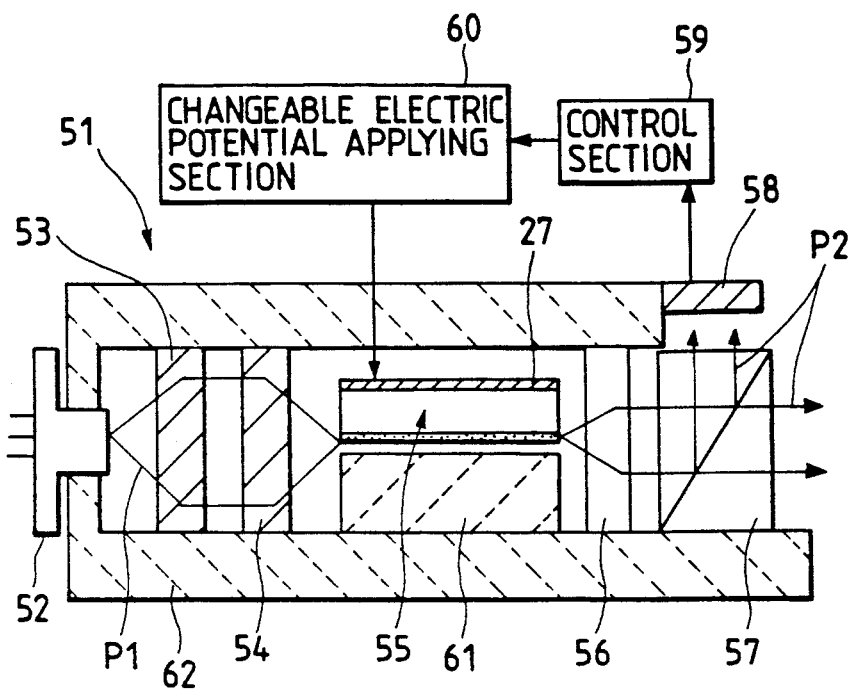
FIG. 15 is a sectional view of a shorter wavelength generating apparatus according to a third embodiment.
Figure 16:
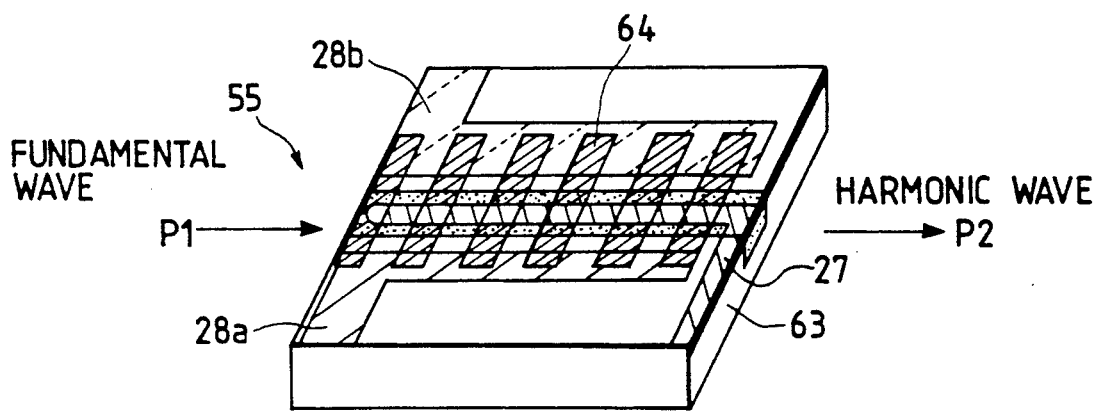
FIG. 16 is a diagonal view of an optical harmonic generating device shown in FIG. 15.

FIG. 15 is a sectional view of a shorter wavelength generating apparatus according to the third embodiment. FIG. 16 is a diagonal view of an optical harmonic generating device shown in FIG. 15.

As shown in FIG. 15, a shorter wavelength generating apparatus 51 comprises a semiconductor laser source 52 in which a fundamental wave P1 of semiconductor laser is generated, a fundamental wave collimator 53 for collimating the fundamental wave P1 generated in the semiconductor laser source 52, a focus lens 54 for focusing the fundamental wave P1 collimated by the fundamental wave collimator 53, an optical harmonic generating device 55 for generating a harmonic wave P2 from the fundamental wave P1 focused by the focus lens 54, a harmonic wave collimator 56 for collimating the harmonic wave P2 generated in the optical harmonic generating device 55, a beam splitter 57 for splitting the harmonic wave P2 collimated by the harmonic wave collimator 56 in two, a harmonic wave detector 58 for detecting the intensity of one of the harmonic waves splitted by the beam splitter 57, a control section 59 for controlling a changeable electric potential to be applied to the optical harmonic generating device 55 according to the intensity of the harmonic wave detected by the harmonic wave detector 58, a changeable electric potential applying section 60 for applying a changeable electric potential to the optical harmonic generating device 55 under control of the control section 59, a plate type of heat insulator 61 made of quartz for thermally insulating the optical harmonic generating device 55 from the ambient air, and a box type of housing 62 for mounting the semiconductor laser source 52, the fundamental wave collimator 53, the focus lens 54, the heat insulator 61 mounting the optical harmonic generating device 55, the harmonic wave collimator 56, the beam splitter 57, and the harmonic wave detector 58.

As shown in FIG. 16, the configuration of the optical harmonic generating device 55 is the same as the optical harmonic generating device 21 in the first embodiment, except for the LiTaO$_3$ substrate 22. That is, the optical harmonic generating device 55 is manufactured by utilizing a rectangular solid type of substrate 63 made of non-linear optical crystal LiNbO$_3$ in which MgO is doped, in place of the LiTaO$_3$ substrate 22.

Because the LiNbO$_3$ substrate 63 is utilized, proton exchange layers made by immersing the LiNbO$_3$ substrate 63 in the pyrophosphoric acid solution according to the first proton exchange process are heated at a high temperature of 1100° C. to produce a plurality of reverse polarization layers 64. In this case, because the Curie temperature Tc of MgO is 1200° C. and because the Curie temperature Tc of LiNbO$_3$ is 1140° C., the reverse polarization layers 64 are produced at the high temperature as compared with the reverse polarization layers 13, 23, 33.

In the above configuration of the shorter wavelength generating apparatus 51, a fundamental wave P1 generated in the semiconductor laser source 52 is optically adjusted by the collimator 53 and the focus lens 54. Thereafter, the fundamental wave P1 is radiated to the input portion 25$a$ of the wave guide 25 so that the fundamental wave P1 is converted to a harmonic wave P2. In this case, a changeable electric potential is applied to the first electrode 27 of the optical harmonic generating device 55 to satisfy the pseudo-phase matching condition under the control of the control section 59.

Therefore, the harmonic wave P2 is amplified in the optical harmonic generating device 55, and the harmonic wave P2 amplified is radiated to the outside.

In cases where the wavelength $\lambda_f$ of the fundamental wave P1 is changed because an ambient temperature is changed, the intensity of the harmonic wave P2 amplified is reduced. At this time, the reduction of the intensity of the harmonic wave P2 is promptly detected by the detector 58 because the intensity of the harmonic wave P2 amplified is always detected by the detector 58. Thereafter, the changeable electric potential applied to the first electrode 27 of the optical harmonic generating device 55 is controlled by the control section 59 to satisfy the pseudo-phase matching condition.

Accordingly, even though the wavelength $\lambda_f$ of the fundamental wave P1 is changed, the pseudo-phase matching condition is satisfied under control of the control section 59 so that the harmonic wave P2 amplified is maintained at a maximum intensity.

Also, in cases where the changeable electric potential is controlled under the control section 59 to form a series of harmonic wave pulses, the harmonic wave P2 modulated can be produced.

Figures 17, 18:
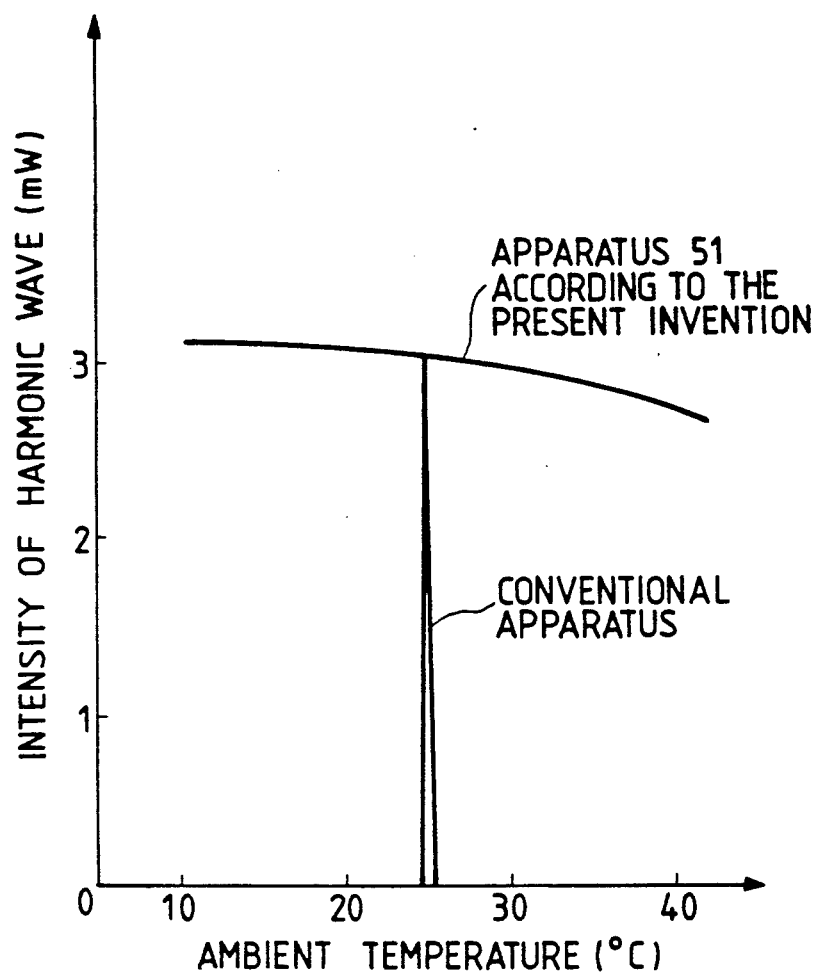
FIG. 17 shows a relationship between the intensity of a harmonic wave and an ambient temperature in the shorter wavelength generating apparatus shown in FIG. 15.
FIG. 18 shows a comparison in the intensity of a harmonic wave between a conventional shorter wavelength generating apparatus and the shorter wavelength generating apparatus shown in FIG. 15 in tabular form.

FIG. 17 shows a relationship between the intensity of the harmonic wave P2 and the ambient temperature. FIG. 18 shows a comparison in the intensity of the harmonic wave P2 between a conventional shorter wavelength generating apparatus and the shorter wavelength generating apparatus 51, in tabular form.

As shown in FIG. 17, in cases where the ambient temperature is 25° C., the pseudo-phase matching condition is satisfied in a conventional shorter wavelength generating apparatus in which no electric potential is applied to a conventional optical harmonic generating device. Therefore, as shown in FIG. 18, the electric power of the harmonic wave P2 is 3 mW at the temperature of 25° C. However, in cases where the ambient temperature varies from 25° C., the intensity of the harmonic wave P2 is rapidly reduced because the pseudo-phase matching condition is not satisfied. Therefore, as shown in FIG. 18, the electric power of the harmonic wave P2 is 0 mW at a temperature of 35° C.

In contrast, the pseudo-phase matching condition is satisfied in the shorter wavelength generating apparatus 51 even though the ambient temperature is changed. That is, the intensity of the harmonic wave P2 is stable at ambient temperatures ranging from 10° C. to 40° C. For example, as shown in FIG. 18, the electric power of the harmonic wave P2 is 3 mW at the temperature of 25° C., and the electric power of the harmonic wave P2 is 2.9 mW at the temperature of 35° C.

In this case, a conversion efficiency in the electric power from the fundamental wave P1 to the harmonic wave P2 is 4.0% in cases where the electric power of the fundamental wave P1 is 80 mW.

In the third embodiment, the fundamental wave P1 is generated in the semiconductor laser source 52. However, it is preferred that the fundamental wave P1 be generated in a solid state laser source. For example, yttrium-aluminium-garnet laser and YVO$_4$ laser are useful as the solid state laser.

In this case, the wavelength of the solid state laser is constant, independent of the ambient temperature, a shorter wavelength generating apparatus in which the solid state laser source is utilized is useful to produce the modulated harmonic wave.

Also, the optical harmonic generating device 55 in which the MgO doped LiNbO$_3$ substrate 63 is utilized is put in the shorter wavelength generating apparatus 51. However, it is preferred that the optical harmonic generating device 21 or the optical harmonic generating device 31 be put in the shorter wavelength generating apparatus 51.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An optical harmonic generating device for generating a harmonic wave from a fundamental wave, comprising:
   fundamental wave converting means for converting a fundamental wave to a harmonic wave in first dielectric polarization layers of which a dielectric polarization is directed in a first direction, the first dielectric polarization layers being periodically arranged at regular intervals;
   harmonic wave amplifying means for amplifying the harmonic wave converted in the fundamental wave converting means in a second dielectric polarization layers of which a dielectric polarization is directed in a second direction opposite to the first direction, each of the second dielectric polarization layers being arranged between the first dielectric polarization layers; and
   electric field inducing means for inducing an electric field in the first dielectric polarization layers of the fundamental wave converting means and the second dielectric polarization layers of the harmonic wave amplifying means to change refractive indices of the first and second dielectric polarization layers.

2. A device according to claim 1 in which the electric field induced by the electric field inducing means is directed in the first direction in the first dielectric polarization layers of the fundamental wave converting means to reduce the refractive index of the first dielectric polarization layers and is directed in the second direction in the second dielectric polarization layers of the harmonic wave amplifying means to reduce the refractive index of the second dielectric polarization layers, reduction of the refractive index for the harmonic wave differing from that of the refractive index for the fundamental wave.

3. A device according to claim 1 in which the electric field induced by the electric field inducing means is directed in the second direction in the first dielectric polarization layers of the fundamental wave converting means to increase the refractive index of the first dielectric polarization layers and is directed in the first direction in the second dielectric polarization layers of the harmonic wave amplifying means to increase the refractive index of the second dielectric polarization layers, increase of the refractive index for the harmonic wave differing from that of the refractive index for the fundamental wave.

4. A device according to claim 1 in which a part of the fundamental wave passes through alternate rows of the first and second dielectric polarization layers to produce the harmonic wave, and a remaining part of the fundamental wave passes through either the first dielectric polarization layers or the second dielectric polarization layers to change the refractive index of either the first dielectric polarization layers or the second dielectric polarization layers for the fundamental wave.

5. An optical harmonic generating device for generating a harmonic wave from a fundamental wave, comprising:
   a plurality of reverse polarization layers which comprise a non-linear optical crystal and are periodically arranged at regular intervals, the reverse polarization layers being dielectrically polarized in a first direction;
   a non-reverse polarization layer which comprises a non-linear optical crystal of a first depth S1 and is arranged to surround the reverse polarization layers, the non-reverse polarization layer being dielectrically polarized in a second direction opposite to the first direction, and the first depth S2 being deeper than a second depth S2 of the reverse polarization layers;
   a wave guide penetrating through alternate rows of the reverse and non-reverse polarization layers for transmitting the fundamental wave and the harmonic wave, the fundamental wave radiated to one end of the wave guide being converted to the harmonic wave in the reverse polarization layers, and the harmonic wave converted being amplified in the non-reverse polarization layer before the harmonic wave amplified is radiated from another end of the wave guide;
   a first electrode arranged on the wave guide; and
   a second electrode arranged on ends of the alternate rows of the reverse and non-reverse polarization layers,
   (1) an electric field induced between the first electrode and the second electrode through the wave guide,
   (2) a part of the electric field passing through the reverse polarization layers in the wave guide from upper sides thereof to lower sides thereof to change a refractive index of the reverse polarization layers, and (3) another part of the electric field passing through the non-reverse polarization layer in the wave guide from an upper side thereof to a lower side thereof to change a refractive index of the non-reverse polarization layer.

6. A device according to claim 5 in which an insulation film is disposed between the wave guide and the first electrode.

7. A device according to claim 5 in which the reverse and non-reverse polarization layers comprise $LiNb_xTa_{1-x}O_3$ where $(0 \leq X \leq 1)$.

8. A device according to claim 5 in which the reverse and non-reverse polarization layers are respectively made of $LiNbO_3$ in which MgO is doped.

9. A device according to claim 5 in which the reverse and non-reverse polarization layers comprise $KTiOPO_4$.

10. A device according to claim 5 in which the reverse and non-reverse polarization layers comprise 2-Methyl-4-Nitroaniline.

11. A device according to claim 5 in which $H^+$ ions are changed with metal ions of the reverse and non-reverse polarization layers positioned in the wave guide.

12. A device according to claim 5 in which the fundamental wave and the harmonic wave are distributed in a single mode.

13. A device according to claim 5 in which the harmonic wave passing through the reverse polarization layers is distributed between the upper sides of the reverse polarization layers and middle portions of the reverse polarization layers, the middle portions being positioned at a third depth S3 of the reverse polarization layers, and the second depth S2 of the reverse polarization layers being deeper than the third depth S3.

14. An optical harmonic generating device for generating a harmonic wave from a fundamental wave, comprising:
a plurality of reverse polarization layers of a non-linear optical crystal and said polarization layers being periodically arranged at regular intervals, the reverse polarization layers being dielectrically polarized in a first direction;
a plurality of non-reverse polarization layers which are made of non-linear optical crystal and are arranged between the reverse polarization layers, the non-reverse polarization layer being dielectrically polarized in a second direction opposite to the first direction;
a wave guide penetrating through alternate rows of the reverse and non-reverse polarization layers for transmitting a fundamental wave and a harmonic wave, the fundamental wave radiated to one end of the wave guide is converted to the harmonic wave in the reverse polarization layers, and the harmonic wave converted is amplified in the non-reverse polarization layer before the harmonic wave amplified is radiated from another end of the wave guide;
a first electrode arranged on the reverse polarization layers; and
a second electrode arranged on the non-reverse polarization layers,
(1) an electric field is induced between the first electrode and the second electrode through the reverse polarization layers and the non-reverse polarization layers,
(2) the electric field penetrating through the reverse polarization layers from upper sides thereof to lower sides thereof, and
(3) the electric field penetrating through the non-reverse polarization layers from lower sides thereof to upper sides thereof to increase or reduce refractive indices of the reverse and non-reverse polarization layers together.

15. A device according to claim 13 in which an insulation film is disposed between the wave guide and the first electrode.

16. A device according to claim 14 in which the reverse and non-reverse polarization layers comprise $LiNb_xTa_{1-x}O_3$ where $(0 \leq X \leq 1)$.

17. A device according to claim 14 in which the reverse and non-reverse polarization layers comprise $LiNbO_3$ into which MgO is doped.

18. A device according to claim 14 in which the reverse and non-reverse polarization layers comprise $KTiOPO_4$.

19. A device according to claim 14 in which the reverse and non-reverse polarization layers comprise Methyl-4-Nitroaniline.

20. A device according to claim 14 in which $H^+$ ions are changed with metal ions of the reverse and non-reverse polarization layers positioned in the wave guide.

21. A device according to claim 14 in which the fundamental wave and the harmonic wave are distributed in a single mode.

22. A shorter wavelength generating apparatus, comprising:
laser generating means for generating a beam of laser light mainly composed of a fundamental wave;
fundamental wave converting means for converting the fundamental wave generated by the laser generating means to a harmonic wave in first dielectric polarization layers of which a dielectric polarization is directed in a first direction, a wavelength $\lambda_h$ of the harmonic wave being equivalent to a multiple of a wavelength $\lambda_f$ of the fundamental wave, and the first dielectric polarization layers being periodically arranged at regular intervals;
harmonic wave amplifying means for amplifying the harmonic wave converted in the fundamental wave converting means in second dielectric polarization layers of which a dielectric polarization is directed in a second direction opposite to the first direction, each of the second dielectric polarization layers being disposed between the first dielectric polarization layers; and
electric field inducing means for inducing electric field in the first dielectric polarization layers of the fundamental wave converting means and the second dielectric polarization layers of the harmonic wave amplifying means to change refractive indices of the first and second dielectric polarization layers.

23. An apparatus according to claim 22 in which the laser generating means is a semiconductor laser source.

24. An apparatus according to claim 22 in which the laser generating means is a solid state laser source selected from the group consisting of yttrium-aluminum-garnet laser and $YVO_4$.

25. An apparatus according to claim 22, additionally including:

harmonic wave splitting means for splitting the harmonic wave amplified by the harmonic wave amplifying means into;
detecting means for detecting an intensity of the harmonic wave split by the harmonic wave splitting means; and
controlling means for controlling an intensity of the electric field induced by the electric field inducing means according to the intensity of the harmonic wave detected by the detecting means to set the intensity of the harmonic wave detected by the detecting means to a predetermined value.

* * * * *